United States Patent
Minezaki et al.

(10) Patent No.: US 7,092,961 B2
(45) Date of Patent: Aug. 15, 2006

(54) DATA MAP FORMING SYSTEM AND METHOD OF FORMING A DATA MAP BASED ON EVALUATION VALUES

(75) Inventors: Yutaka Minezaki, Tokyo (JP); Toshiyuki Azuma, Kanagawa-ken (JP)

(73) Assignee: Nissan Motor Co., Ltd., Kanagwa-Ken (JP)

( * ) Notice: Subject to any disclaimer, the term of this patent is extended or adjusted under 35 U.S.C. 154(b) by 418 days.

(21) Appl. No.: 09/813,799

(22) Filed: Mar. 22, 2001

(65) Prior Publication Data

US 2001/0028362 A1    Oct. 11, 2001

(30) Foreign Application Priority Data

Mar. 28, 2000 (JP) .............................. P2000-89866

(51) Int. Cl.
    G06F 17/30 (2006.01)

(52) U.S. Cl. ..................... 707/104.1; 707/102

(58) Field of Classification Search ............... 707/100, 707/102, 104.1; 715/503, 514, 500
    See application file for complete search history.

(56) References Cited

U.S. PATENT DOCUMENTS

| | | | |
|---|---|---|---|
| 5,717,923 A * | 2/1998 | Dedrick ....................... 707/102 |
| 5,721,910 A | 2/1998 | Unger et al. |
| 5,991,780 A | 11/1999 | Rivette et al. |
| 6,006,223 A * | 12/1999 | Agrawal et al. ................ 707/5 |
| 6,137,488 A * | 10/2000 | Kraft et al. .................. 345/866 |
| 6,662,178 B1 * | 12/2003 | Lee ............................... 707/3 |
| 6,665,656 B1 * | 12/2003 | Carter ........................... 707/3 |
| 6,665,670 B1 * | 12/2003 | Winer et al. .................... 707/6 |

FOREIGN PATENT DOCUMENTS

| | | |
|---|---|---|
| JP | 6-231141 | 8/1994 |
| JP | 06231141 | 8/1994 |
| JP | 8-221435 | 8/1996 |
| JP | 11015833 | 1/1999 |
| JP | 11-203292 | 7/1999 |
| WO | WO98/04981 | 2/1998 |
| WO | WO 98 55945 | 12/1998 |

OTHER PUBLICATIONS

"Internet and client server patent information systems: new services from Derwent", J. Lee, World Patent Information, Elsevier Sciences Publishing, vol. 20, No. 2, Jun. 1998, pp. 136-139.

"The EPOQUE Suite of Applications", J. F. Sibley, World Patent Information, Elsevier Sciences Publishing, vol. 18, No. 3, Sep. 1, 1996, pp. 141-148.

European Search Report.

* cited by examiner

*Primary Examiner*—Greta Robinson
(74) *Attorney, Agent, or Firm*—McDermott Will & Emery LLP

(57) ABSTRACT

A data display system (10) and a patent map forming system (20) give evaluation values obtained by a predetermined evaluation axis or an arbitrarily set evaluation value in cooperation with each other, and forms a map sheet (MS) on the basis of the evaluation values. The data display system (10) acquires a first-class identification code such as a publication number from a basic data sheet (DS) obtained by listing bibliographical information or the like of a patent input by a spreadsheet software (22) from an input file, and an identification code conversion unit converts (12) the first-class identification code into a second-class identification code. A patent data server (SV) is directly accessed by the second-class identification code to read an abstract, a representative drawing, all documents, drawings, and the like, serving as detailed data, thereby displaying these data on a display (DP).

8 Claims, 16 Drawing Sheets

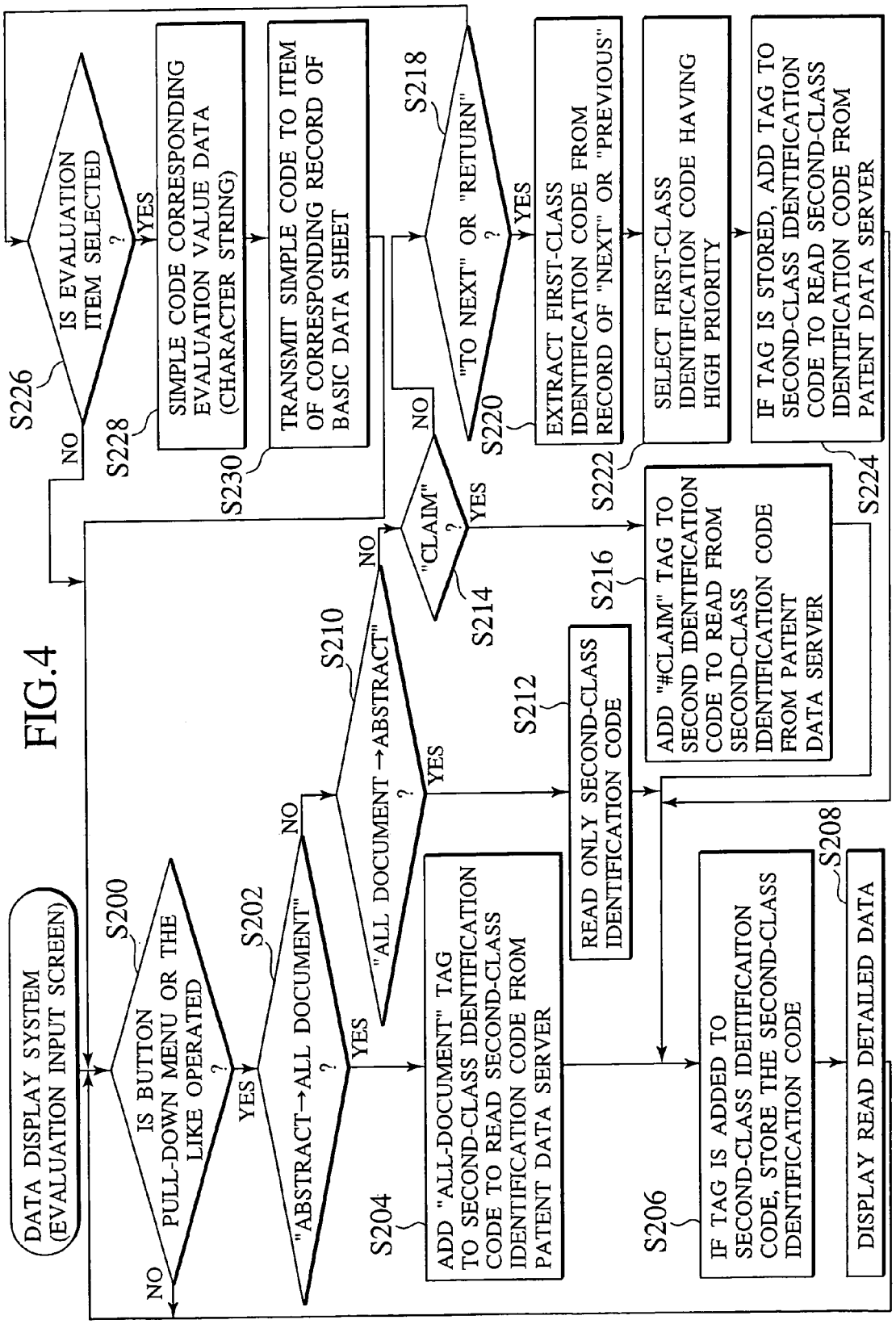

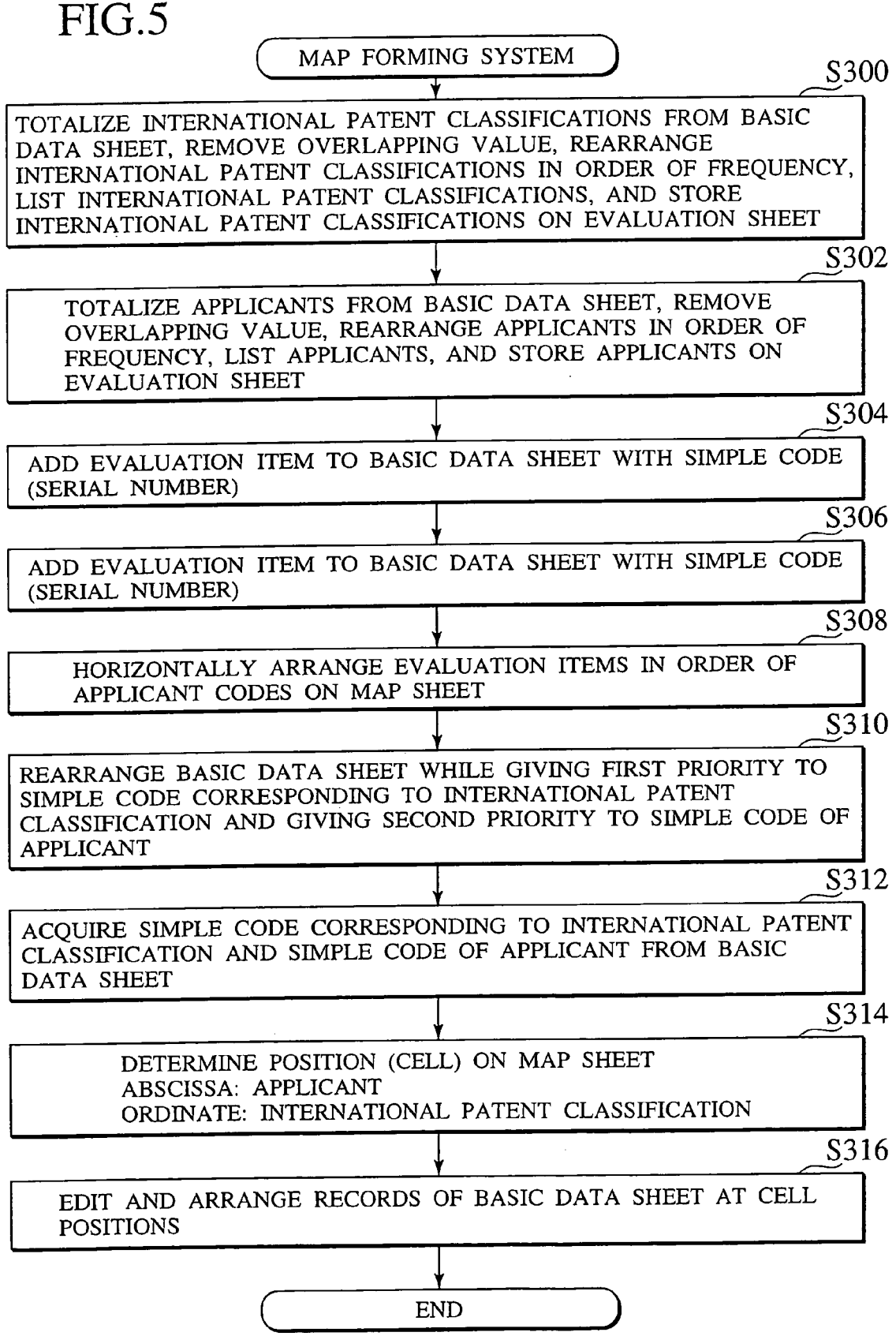

FIG. 6

| | A | B | C | D | E | F | G | H | I | J | K | L | M | N | O | P |
|---|---|---|---|---|---|---|---|---|---|---|---|---|---|---|---|---|
| 4 | SETTING OF EVALUATION AXIS OR THE LIKE | | | | THEME NAME : FOR DEMONSTRATION | | | | | RETURN TO MENU | | | | | | |
| 6 | | 602 | | 603 | | 604 | | 605 | | 606 | | 607 | 608 | | 609 | |
| 7 | | | | | | | | | | | | | | | | |
| 8 | | X AXIS | | Y AXIS | | DEGREE OF | | REQUEST FOR E | | EMPLOYMENT STATE | | CLASSIFICATION | APPLICANT | | FILING YEAR | |
| 9 | | 6 | | 3 | | 3 | | 5 | | 3 | | 10 | 10 | | 10 | |
| 10 | | | | | | | | | | | | | | | | |
| 11 | | 1 BODY | | 1 QUALITY | | 1 A | | 1 EXISTS | | 1 IN-EMPLOYMENT | | 1 B60R 21/ | 1 ×× × | M1 | 1 1989 | 1 |
| 12 | | 2 CHASSIS | | 2 COST REDUCTI | | 2 B | | 2 NO | | 2 EMPOYMENT IS P | | 2 B6015/ | 2 ○○○ | M2 | 2 1980 1990 | 2 |
| 13 | | 3 ENGINE | | 3 PERFORMANCE | | 3 C | | 3 REGISTERED | | 3 NO EXPECTATION | | 3 B60N 3/ | 3 △△△ | M3 | 3 1998 1991 | 3 |
| 14 | | --- | | --- | | --- | | --- | | --- | | --- | --- | --- | --- | --- |

NOTE) THREE ITEMS OF THE PHONETIC SIGN DISPLAYS INCLUDING ITEM NAMES CAN BE FREELY SET

NOTE) PORTION PAINTED WITH BLUE IS AUTOMATICALLY SET

MENU XY LIST/DATA / NEW DATA  XY MAP 6 YEAR - CLASSIFICATION /SSIFICATION OCESSING / ⊲

| | A | B | | | C | D | E | F |
|---|---|---|---|---|---|---|---|---|
| 6 | MAP FORMATION/UPDATING | MAP CLEAR | RETURN TO MENU | | | | | |
| 7 | ××× MOTER ▸ | ABSCISSA | B60R 21/▾ ORDINATE | | | | | |
| 8 | APPLICANT - CLASSIFICATION MAP | | | 10C | | | | |
| 9 | | | | | | | | |
| 10 | 10B  CONTENT DISPLAY | | | | ××× MOTERS | ○○○ MOTERS | △△△ MOTERS | ◇◇◇ MOTERS |
| 11 | B60R 21/   10D | | | | ××× JAPANESE EXAMINED UTILITY MODEL PUBLICATION NO. H07-040435 AIRBAG 1988/02/04 ARMREST REGISTERED EMPLOYMENT IS PLANNED IN NEXT PERIOD | | | |
| 12 | B60J 5/ | | | | | | | |
| 13 | | | | | | | | |
| 14 | | | | | | | | |
| 15 | | | | | | | | |
| 16 | | | | | | | | |

| | A | B | C | D | E | F |
|---|---|---|---|---|---|---|
| 6 | MAP FORMATION/UPDATING | MAP CLEAR | RETURN TO MENU | | | |
| 7 | P/T | ▶ ABSCISSA | FEEDBACK ▼ ORDINATE | | | |
| 8 | | X-Y MAP | | | | |
| 9 | | | | | | |
| 10 | | CONTENT DISPLAY | SWITCH | CONTROL UNIT | PARTS FOR CONTROL | |
| 42 | TOTAL CONTROL WITH CHASSIS | | | ××× MOTER<br>JAPANESE PATENT APPLICATION LAID-OPEN NO. H05-305842<br>ANTI-LOCK BRAKING DEVICE | | |
| 43 | | | | | | |
| 44 | | | | | | |
| 45 | | | | | | |
| 46 | | | | | | |
| 47 | OTHER NEW TECHNIQUE | | | DENSO<br>JAPANESE PATENT APPLICATION LAID-OPEN NO. H10-315288<br>AUTOMATIC CLUTCH CONTROL DEVICE<br>CONTROL UNIT | | |

◀ ▶ ▶│ XY LIST/DATA　 EW DAIXY MAP/AR - CLASSIFICATION/AR - APPLICANT/IFICATION/APPLICATION/INGFICATION/

FIG.14

| | A | B | C | D | E |
|---|---|---|---|---|---|
| 1 | THEME NAME : FOR DEMONSTRATION | | RETURN TO MENU | | |
| 2 | STATISTICS   14A | | | | |
| 4 | | | | | |
| 10 | THE NUMBER OF DATA : NAME | | | | |
| 11 | APPLICANT | | TOTAL | | |
| 12 | ×× × MOTER | | 6 | | |
| 13 | □□□ KOGYO | | 6 | | |
| 14 | ◇◇ ◇ CORPORATION | | 4 | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |
| 24 | | | | | |
| 25 | | | | | |
| 26 | | | | | |
| 27 | | | | | |
| 28 | | | | | |
| 29 | | | | | |
| 30 | | | | | |
| 31 | | | | | |
| 32 | | | | | |
| 33 | | | | | |
| 34 | ▽▽▽ LIGHT-METAL | | | | |
| 35 | ☆☆☆ AUTOMOTIVE ENGINEERING | | | | |
| 36 | TOTAL | | 44 | | |
| 37 | | | | | |
| 38 | | | | | |

\FILING YEAR - CLASSIFICATION/ATION/ING/

FIG. 16

DATA MAP FORMING SYSTEM AND METHOD OF FORMING A DATA MAP BASED ON EVALUATION VALUES

BACKGROUND OF THE INVENTION

The present invention relates to a system for forming a classification map by the values of specific items of a plurality of records having a plurality of items and, more particularly, to a data map forming system and a data map forming method for forming a data map in the form of a matrix depending on the respective values of two specific items and, further more particularly, to a display system for exactly displaying a specific items of specific data on the data map or a specific item of specific data on a basic data sheet.

In a earlier technique, a spreadsheet software (e.g., 'Excel' available from Microsoft Corporation) installed in a personal computer is used to form a list (file in a list format) by a plurality of records having a plurality of items, so that the characteristics or the like of the records are analyzed.

As a list for performing such a synthesis, for example, a list of bibliographical items of a plurality of patent records searched and extracted from a database of unexamined patent publications supplied from a memory medium such as a CD-ROM under predetermined conditions is known. The plurality of patent records are rearranged by items such as filing dates, international patent classifications, applicants, and the like of the bibliographical items, and statistics are compiled with respect to the patent records. The patent records are used to examine a technical trend of other companies.

SUMMARY OF THE INVENTION

However, such a earlier list has the following problem. That is, patent records to be examined includes various items, e.g., bibliographical items such as a filing date, claims, and a representative drawing. It is difficult in consideration to a file capacity that the list includes all the items.

For this reason, evaluation of data cannot be performed on the list without making the operation cumbersome.

In addition, when specific items such as international patent classifications and applicants are rearranged with respect to the international patent classifications and the applicants, these items are arranged in the alphabetical order or in the order of Japanese syllabary. For this reason, the following problem is posed. That is, when a map having a matrix format is formed on the basis of this order, in order to form a map being in consideration of a frequency, the operation is also cumbersome.

Furthermore, the following problem is posed. That is, in order to form a patent map while performing technical classification different from the international patent classification or classification or evaluation to respective patent applications with an arbitrary evaluation measure, there is no tool which easily inputs the classification or the evaluation with reference to summaries, specifications, drawings, and the like as needed.

It is an object of the present invention to provide a data display system, a data map forming system, and a data map forming method which realize reduction in data evaluation operation to make formation of a data map having a high utility.

In order to achieve the above object, a data display system according to the present invention comprises: acquiring means for acquiring, from a basic data sheet which can store a plurality of first-class records including, as items, at least one first-class identification code which can be easily or generally understood by a reader or an operator in a list state, items of the first-class identification code; conversion means for converting the acquired first-class identification code into a second-class identification code different from the first-class identification code; and display means for acquiring, from a data server in which a plurality of second-class records including items corresponding to the items of the first-class identification code and a plurality of items related to the items such that the second-class identification code is given to the second-class records, first specific item information of the second-class records identified by the second identification code obtained by the conversion means to display the specific item information.

In order to achieve the above object, a data display method according to the present invention: acquires, from a basic data sheet which can store a plurality of first-class records including, as items, at least one first-class identification code which can be easily or generally understood by a reader or an operator in a list state, items of the first-class identification code; converts the acquired first-class identification code into a second-class identification code different from the first-class identification code; and acquires, from a data server in which a plurality of second-class records including items corresponding to the items of the first-class identification code and a plurality of items related to the items such that the second-class identification code is given to the second-class records, first specific item information of the second-class records identified by the second identification code obtained by the conversion means; and displays the specific item information.

In order to achieve the above object, a data map forming system according to the present invention comprises: a basic data sheet which can store a plurality of first-class records including a plurality of different items in a list state; first evaluation item listing setting means for totalizing values of first specific items of the plurality of first-class records on the basic data sheet and arranging the values and first simple codes corresponding to the values in a predetermined arrangement order in such a state that overlapping values of the values are removed to perform listing setting; second evaluation item listing setting means for totalizing values of second specific items of the plurality of first-class records on the basic data sheet and arranging the values and second simple codes corresponding to the values in a predetermined arrangement order in such a state that overlapping values of the values are removed to perform listing setting; first-classifying means for classifying the plurality of first-class records by the first simple codes corresponding to the values set by the first evaluation item listing setting means on the basis of the values of the first specific items of the first-class records; second classifying means for classifying the plurality of first-class records by the second simple codes corresponding to the values set by the second evaluation item listing setting means on the basis of the values of the second specific items of the first-class records; rearrangement means for rearranging the plurality of first-class records while giving priority to the first simple codes given by the first-classifying means and rearranging the plurality of first-class records by the second simple codes given by the second classifying means; a map sheet different from the basic data sheet; second simple code parallel arrangement means for arranging the second simple codes listed by the second evaluation item listing setting means on the map sheet in an order of a list on the right side in the horizontal direction in such a state that an interval is opened in a vertical column on at least the left side; specific item mapping means for acquiring display specific items, the first simple codes, and the second simple codes from the plurality of first-class records in the order of the first-class records rearranged by the first simple codes, determining vertical direction positions on the map sheet means by the first simple codes and horizontal direction positions on the map sheet by the second simple codes, arranging the display specific items at cell positions where the vertical direction positions and the horizontal direction positions cross, and arranging the first simple codes on the left column opened by the second simple code parallel arrangement means; and output means for displaying or printing a matrix-like map sheet means formed by the specific item mapping means or performing file outputting.

In order to achieve the object, a data map forming method according to the present invention extracts a plurality of values of predetermined references related to a plurality of first-class records on a basic data sheet in which a plurality of first-class records including a plurality of different items can be stored in a list state to list the values as first simple codes in a predetermined arrangement order; extracts a plurality of values of predetermined references having a viewpoint different from the viewpoint of the first simple codes to list the values as second simple codes in a predetermined arrangement order; classifies the first-class records by the first simple codes corresponding to the values on the basis of first specific items of the plurality of first-class records on the basic data sheet; classifies the first-class records by second simple codes corresponding to the values on the basis of values of second specific items of the plurality of first-class records on the basic data sheet; rearranges the plurality of first-class records on the basic data sheet by the predetermined references while giving priority to the first simple codes and rearranges the second simple codes; arranges the second simple codes on a map sheet in an order of a list on the right side in the horizontal direction in such a state that an interval is opened in a vertical column on at least the left side; sequentially acquires the specific items of the first-class records, the first simple codes, and the second simple codes in the order of the first-class records rearranged by the first simple codes; determines vertical direction positions on the map sheet by the first simple codes and horizontal direction positions on the map sheet by the second simple codes in the acquisition order; arranges the specific items at positions where the vertical direction positions and the horizontal direction positions cross; arranges the first simple codes on the left column opened by second simple code parallel arrangement means; and forms a matrix-like map sheet.

BRIEF DESCRIPTION OF THE DRAWINGS

FIG. 4 is a flow chart showing the operation of a data display system according to the embodiment to explain display switching and evaluation inputting on an evaluation input screen.

FIG. 5 is a flow chart showing the operation of a data map forming system according to the embodiment.

FIG. 6 is a diagram showing an example of an evaluation axis setting screen in the embodiment.

FIG. 7 is a diagram showing an example of a basic data sheet screen in the embodiment.

FIG. 8 is a diagram showing an example of a basic data sheet screen in the embodiment.

FIG. 10 is a diagram showing an example of an applicant classification map screen in the embodiment.

FIG. 12 is a diagram showing an example of an X axis-Y axis map screen in the embodiment.

FIG. 14 is a diagram showing an example of a static table screen in the embodiment.

FIG. 16 is a diagram showing a state in which "all drawings" and "claim" buttons are pressed in the all-document display state in FIG. 15 to display a corresponding display item.

DETAILED DESCRIPTION OF THE PREFERRED EMBODIMENT

The present invention will be described below on the basis of the drawings.

Figure 1:
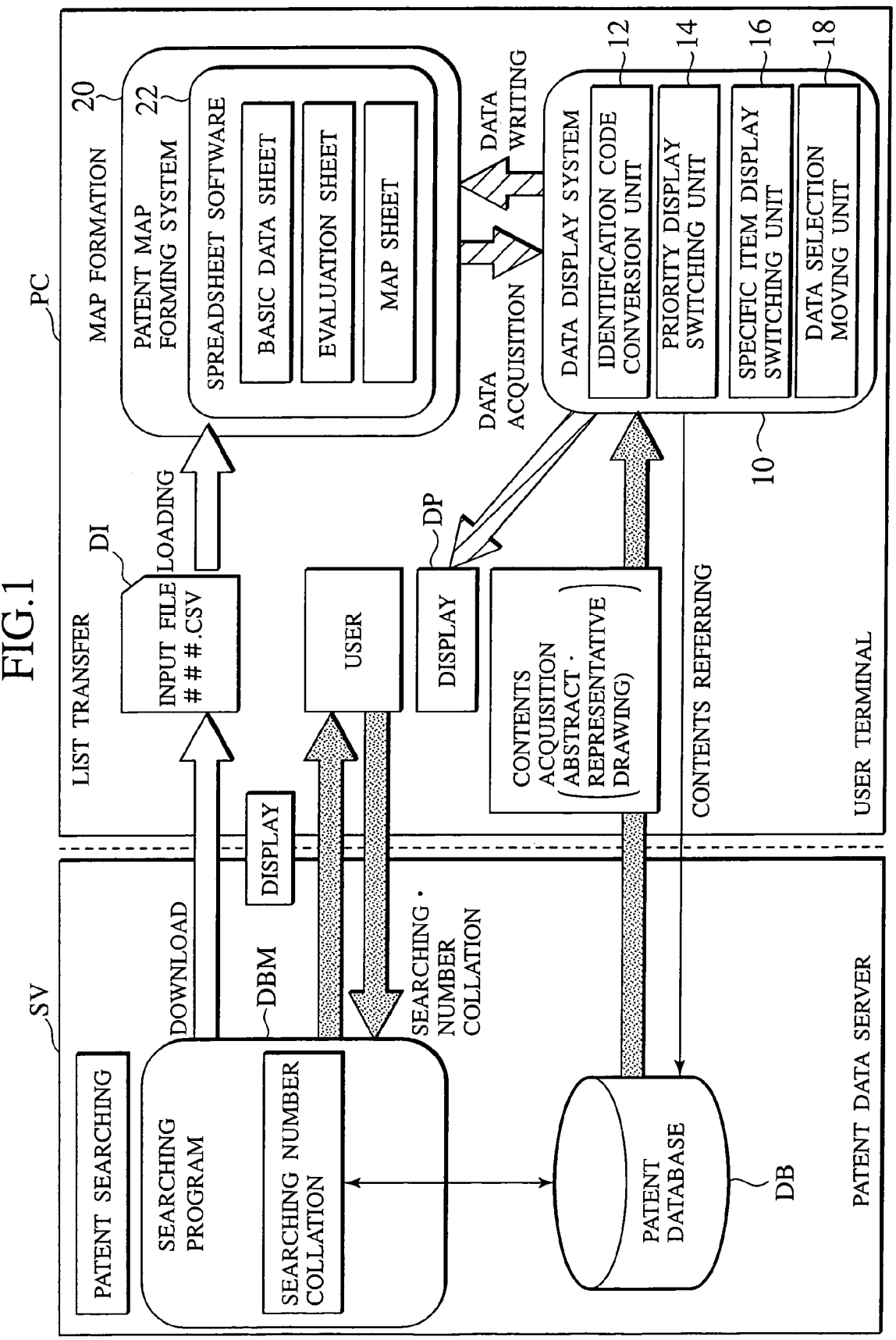
FIG. 1 is a system diagram showing the configuration of an embodiment in which a data display system and a data map forming system according to the present invention are applied to formation of a patent map.
Figure 2:
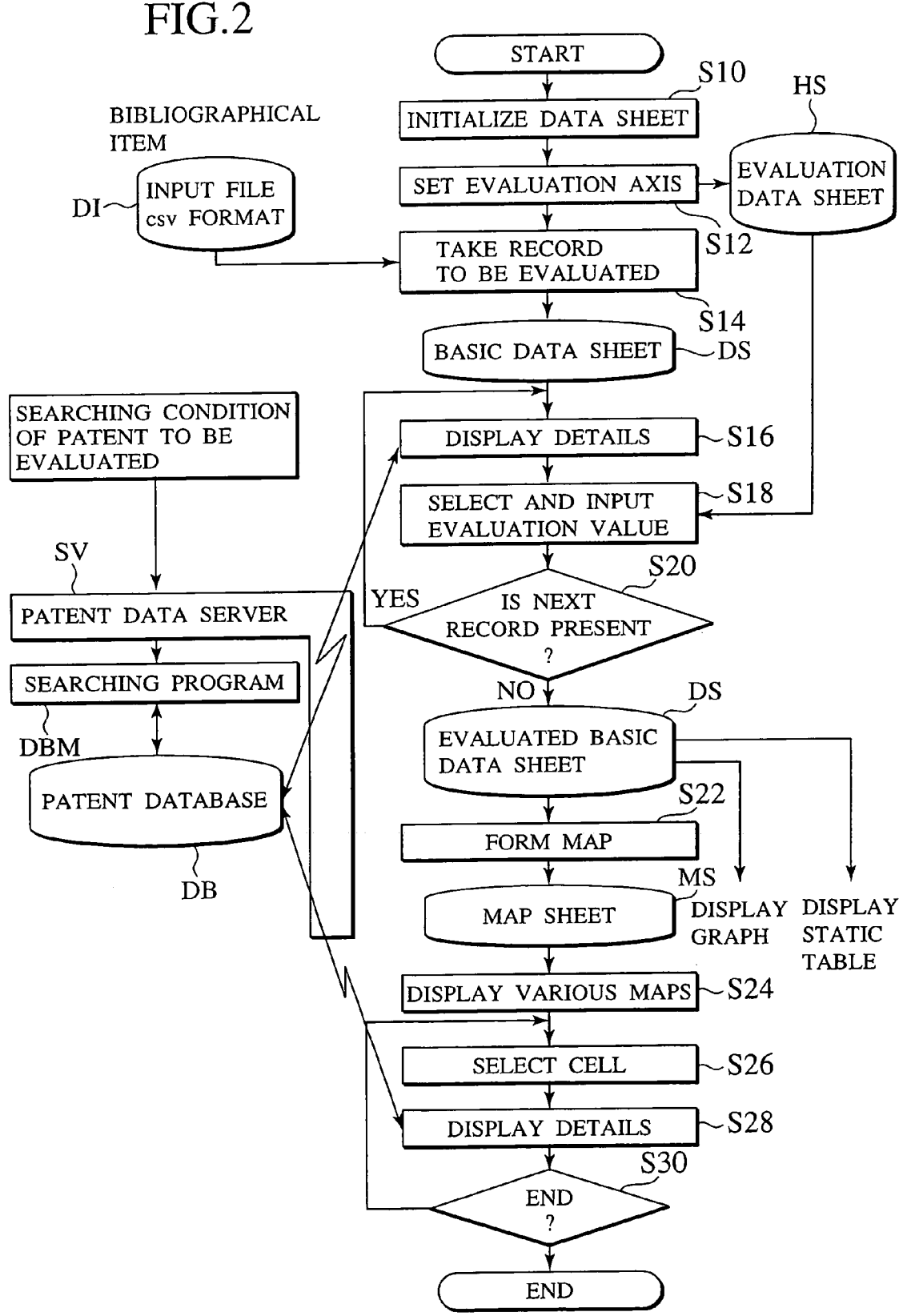
FIG. 2 is a flow chart for explaining the flow of rough processes of the formation of a patent map in this embodiment.

FIG. 1 is a system diagram showing an embodiment of a display system and a patent map forming system serving a data map forming system according to the present invention, FIGS. 2 and 5 are flow charts showing operations in the embodiment, and FIGS. 6 to 14 are diagrams showing examples of various screen displays in the embodiment.

Referring to FIG. 1, a user terminal PC using a personal computer, a workstation, or the like in which a CPU (Central Processing Unit), memory devices such as a ROM, a RAM, and an HDD, a communication control device, and the like are incorporated can use a patent data server SV connected to the user terminal PC through a communication path such as a LAN.

The patent data server SV stores detailed data related to publications such as bibliographical items (publication number, application number, filing date, applicant, international patent classification, and the like), claims, detailed descriptions, and drawings of unexamined patent publications issued by a memory medium such as a CD-ROM in a patent database DB.

The patent data server SV can search for publications corresponding to various searching conditional equations through a searching program DBM for searching the patent database DB. Bibliographical items, a summary, a representative drawing, and the like of a publication extracted on the basis of the searching result can be displayed on a display DP of the user terminal PC, and a contents examiner can perform an examination with reference to the contents.

More specifically, this patent data server SV stores a plurality of electronic patent data serving as a plurality of records including items having, as contents, first-class identification codes which have high understandability and which are easily understood by the examiner, such as unexamined patent publication numbers (e.g., Japanese Unexamined Patent Publication No. 11-012345 or the like) or patent (examined patent application) numbers.

In order to identify memory positions or the like of the respective records stored in the patent database DB, second-class identification codes (e.g., AA99012345, BB9702346, or the like) inherent in the records are given to the memory positions in a format different from that of the first-class identification codes.

The patent data server SV can be provided by downloading the searching result obtained by the searching program DBM on the user terminal PC of the examiner.

The file format used in this download is, in this embodiment, a CSV (comma separated value) file format in which a plurality of patent bibliographical information data (to be referred to as first-class records hereinafter) including, as items, first-class identification codes (e.g., Japanese Unexamined Patent Publication No. 11-012345 and the like) such as unexamined patent publication numbers which can be easily understood by the examiner are divided by comma symbols with respect to, e.g., items to divide records serving as sets of items from each other by line feed symbols.

The user terminal PC of the examiner comprises a data display system 10 and a patent map forming system 20 serving as a data map forming system.

The patent map forming system 20 comprises a spreadsheet software 22 (e.g., Excel available from Microsoft Corporation), and loads a list-like input file DI to be processed downloaded on the user terminal PC in the CSV format on the spreadsheet software 22 to obtain a database (to be referred to as a basic data sheet DS hereinafter) to be processed. The database can be displayed as a list or can be subjected to various processes such as a rearrangement process.

The spreadsheet software 22 stores an evaluation data sheet HS obtained by listing evaluation values for evaluating publications of unexamined patent applications, official gazettes, and the like to be examined with various evaluation axes. From records of the basic data sheet DS to which the results evaluated with the evaluation axes are added, a map sheet MS arranged on a two-dimensional map by the various evaluation axes is formed, and the map sheet MS is stored.

The examiner examines patent contents on the basis of the provided list-like basic data sheet DS to perform evaluation. However, when the evaluation cannot be performed by using only the data items (publication number, filing date, title of invention, international patent classification, inventor, applicant, and the like included in the first-class records serving as bibliographical information on the basic data sheet DS are used, specific item information (abstracts, representative drawings, claims, detailed descriptions, drawings, and the like) of the second-class records which are not included in the first-class records are necessary.

For this reason, when the necessity occurs, the examiner uses the data display system 10 to directly access the patent data server SV on the basis of, e.g., publication number on the basic data sheet DS, and acquires the abstract, representative drawing, claims, detailed description, drawings, and the like corresponding to the publication number, so that the abstract, the representative drawings, the claims, the detailed description, the drawings, and the like can be displayed on the display DP.

More specifically, the data display system 10 comprises an identification code converter 12 serving as a conversion means for converting first-class identification codes PN (e.g., Japanese Unexamined Patent Publication No. 11-12345, Japanese Unexamined Patent Publication No. 2000-1, Japanese Examined Patent Publication No. 10-54321) acquired from the basic data sheet DS into second-class identification codes (e.g., AA99012345, AA00000001, BB98054321) serving as identification codes inherent in the second-class records serving as patent detailed information stored in the patent data server SV.

The data display system 10 has a priority display switching unit 14 related to the first-class identification codes having different priorities, so that the priority display switching unit acquires the specific item information of the corresponding a priority from the patent data server SV depending on the state of a publication data/registration data switching button displayed on the display DP to switch the displays.

The display system has not only a function of accessing the patent data server SV in Japan, but also a function of connecting US Patent and Trademark Office (US-PTO), European Patent Office (EPO), and the like through the Internet. When the patent detailed data corresponding to the first-class identification codes are not on the patent data server SV, and when the detailed data are on a data server (e.g., the patent database of US Patent Office, the database of European Patent Office, and the like) in the foreign country, address conversion is performed to the data server.

The data display system 10 has a specific item display switching unit 16 for selecting the specific items of the second-class records to display the specific items. The specific item display switching unit 16 selects the items of second-class records exactly displayed on the display DP. For example, the specific item display switching unit 16 switches an abstract display and an all-document display to each other.

When a plurality of first-class records (e.g., the record of Japanese Unexamined Utility Model Publication No. 5-1123 and the record of Japanese Unexamined Utility Model Publication No. 5-1124) are on the basic data sheet DS, the data display system 10 has a data selection moving unit 18 to display the next record of the record which is being displayed at the present or to return to the previous display.

In addition, the data display system 10 acquires a plurality of evaluation value data (e.g., "high", "low", "no", and the like in the degree of importance) from the evaluation data sheet HS in which data are stored with respect to a plurality of evaluation axes (e.g., an X axis, a Y axis, and the degree of importance) having different viewpoints and displays the evaluation value data on the screen to evaluate the respective records on the basic data sheet DS. When one of these evaluation value data is selected, the evaluation value data is transmitted to the evaluation items of the first-class records on the basic data sheet DS corresponding to the evaluation data sheet HS to store the evaluation value data at a corresponding position on the basic data sheet DS.

The flow chart in FIG. 2 shows an outline of processes of forming a patent map such that the patent map forming system 20 and the data display system 10 are cooperated.

As a preparation, searching and extracting patent data to be evaluated are performed under desired searching conditions. It is assumed that the bibliographical items of the patent data to be evaluated are obtained as an input file DI of, e.g., the CSV format. The input file DI can also be formed by manual inputting, or may be prepared such that another source data is converted with an appropriate tool.

First, the patent map system initializes the data sheet (step 10, step will be abbreviated as S hereinafter) to set evaluation axes depending on an object for forming the patent map, and forms an evaluation data sheet as shown in FIG. 6 in which a plurality of evaluation values are listed with respect to the evaluation axes (S12). The evaluation values of the set evaluation axes can be additionally set as needed during the evaluation of official gazettes and the like).

Records to be evaluated are taken from the input file DI into the spreadsheet software 22 (S14). The records of the input file DI are the records of bibliographical information of the extracted publications of unexamined patent applications or official gazettes. The publication numbers of the publications of unexamined applications and decided patents include official gazette numbers or patent numbers as the items of the first-class identification codes.

The information of the input file includes not only patents but also utility models. As the information, an unpublished invention to which an intra-office reference number or an application number is added as a first-class identification code may be used.

Figure 7:
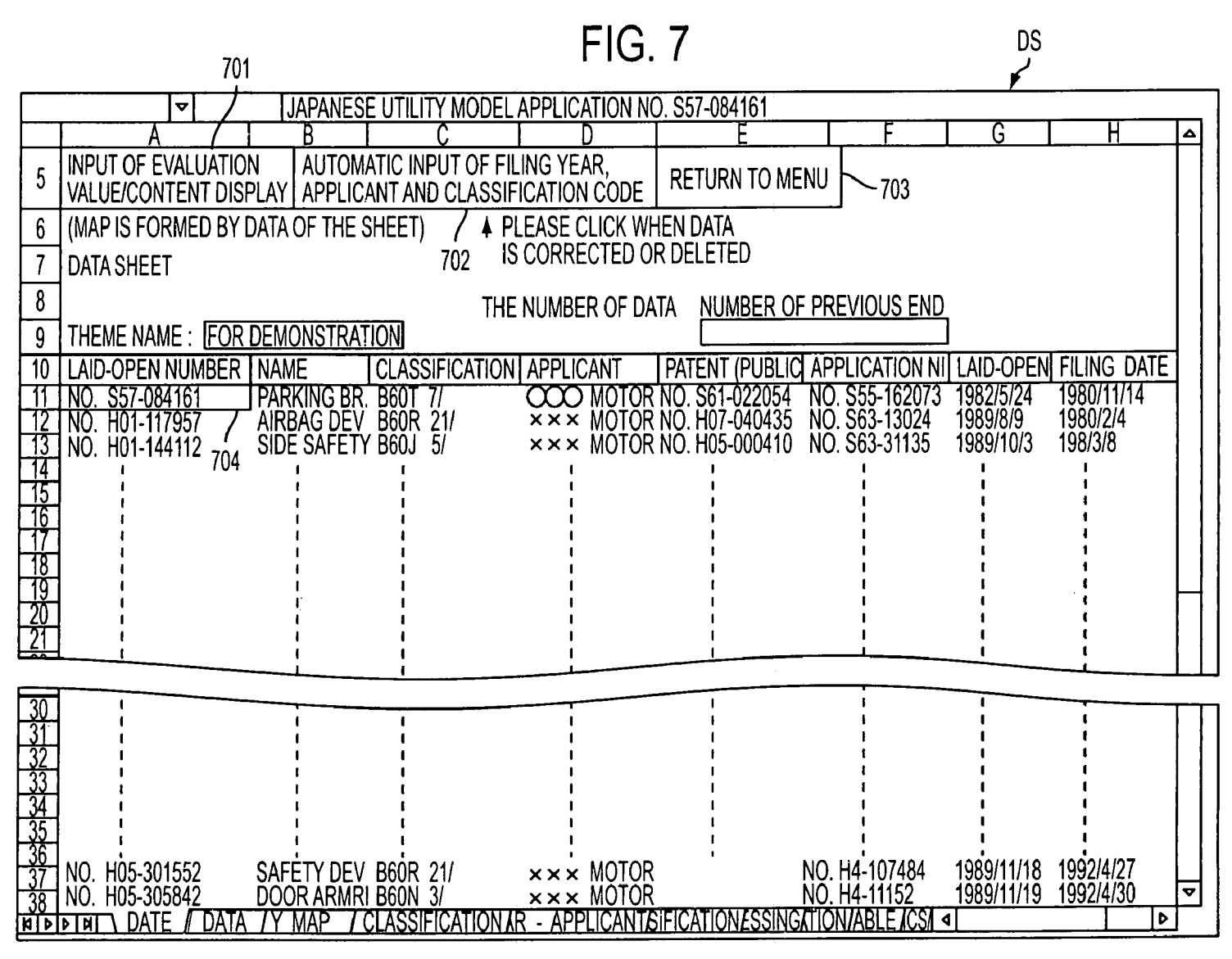
Figure 8:
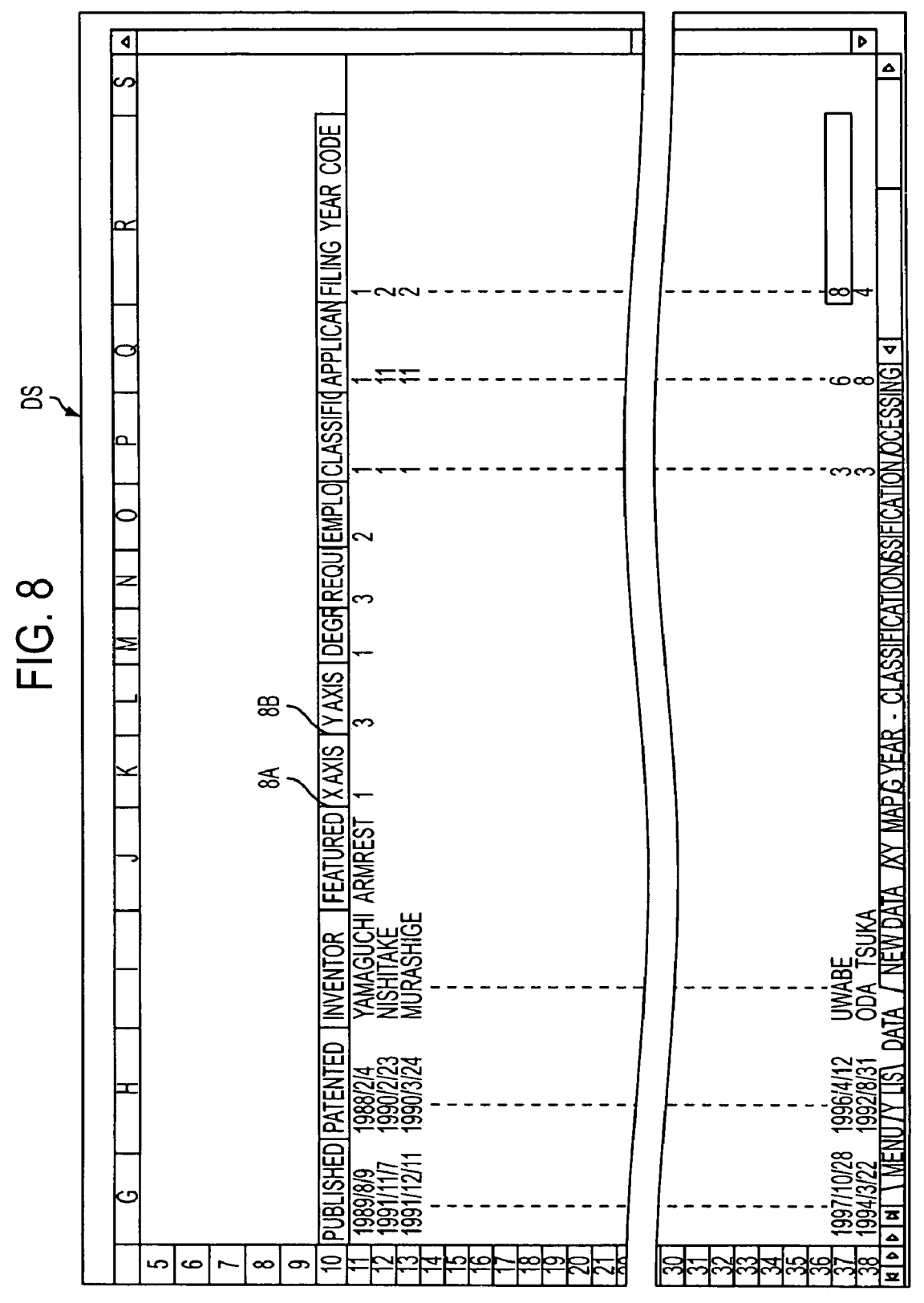

Upon completion of loading the input file DI, the spreadsheet software 22 forms the basic data sheet DS, as shown in FIGS. 7 and 8, having a format in which columns are assigned to the respective items of. the input records and rows are assigned to the records, and displays the basic data sheet DS on the display DP.

On the display screen of the basic data sheet DS shown in FIG. 7, a "input/content display of evaluation or the like" button 701, a "application year, applicant, classification code automatic input" button 702, and a "return to menu" button 703 are arranged. A cell displaying a publication number which is being selected is displayed by a cursor 704.

The basic data sheets DS shown in FIGS. 7 and 8 include, as items of records, publication number, name, classification, applicant, patent (examined patent application) number, application number, filing date, inventor, featured point, X axis, Y axes, the degree of importance, request for examination, employment state, classification code, applicant code, and application year code, and intra-office reference number if necessary.

Of these items, the items of publication number, classification, patent (examined patent application) number, application number, publication date, filing date, inventor are items taken from the input file DI.

The items of X axis, Y axis, the degree of importance, request for examination, employment state, intra-office reference number, classification code, applicant code, and application year code are set in evaluation. The classification code, the applicant code, and the application year code can be automatically set by pressing the "application year, applicant, and classification code automatic input" button 702 in FIG. 7.

Figure 9:
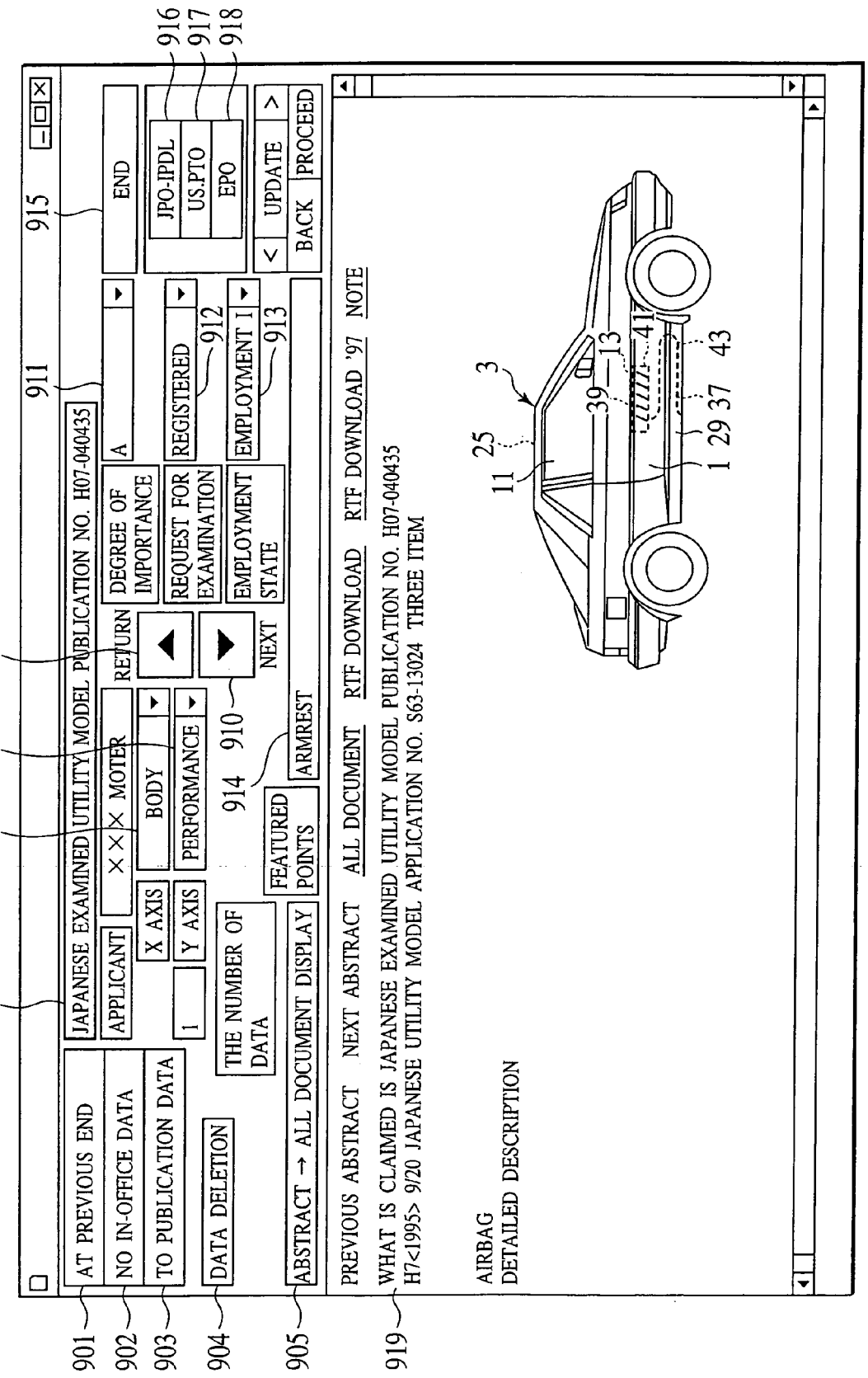
FIG. 9 is a diagram showing an example of an evaluation input screen obtained by a display system according to the embodiment.

When the cell of the publication number on the basic data sheet DS is selected with a mouse or the like, and when the "input/content display of evaluation or the like" button 701 is pressed, the display screen is switched to an evaluation input screen in FIG. 9. The details (specific item information) of the abstract, all documents, and the like of the publication taken from the patent data server SV on the basis of the publication number selected on the basic data sheet DS are displayed on the screen through a detailed data display unit 919 in FIG. 9 (S16).

At this time, the data display system 10 uses an identification code conversion unit 12 serving as a conversion means for converting a first-class identification code PN obtained from the first-class records on the basic data sheet DS and having high understandability, e.g., a generally used or written publication number such as an official gazette number (e.g., Japanese Unexamined Patent Publication No. 11-12345 and Japanese Unexamined Patent Publication No. 2000-1) or a utility model publication number into a second-class identification code (e.g., AA99012345 and AA00000001) which is an identification code inherent in the second-class records for identifying the second-class records.

The patent data server SV is accessed by the second-class identification code obtained by the conversion result, specific item information such as an abstract and a representative drawing which are second-class records corresponding to the first-class identification code PN are requested, so that the specific item information is taken from the patent data server SV to be displayed on the display DP.

When a first-class identification code on the basic data sheet DS is acquired, and when one first-class record on the basic data sheet DS includes a plurality of first-class identification codes having different priorities, i.e., when the first-class record includes a publication number and a patent (examined patent application) number (e.g., Japanese Patent No. 1234456 and Japanese Unexamined Patent Publication No. 63-5523), a first-class identification code PR (e.g., Japanese Patent No. 123456) having a higher priority is selected. The first-class identification code PR having the higher priority is converted into a second identification code (e.g., BB0123456).

On the basis of the converted second-class identification code, the specific item information of the second-class record corresponding to the first-class identification code PR having a high priority is taken from the patent data server SV to be displayed on the display DP.

In the example of the evaluation input screen in FIG. 9, utility model registration is used. For this reason, the first-class identification code having a high priority is Japanese Examined Utility Model Publication No. 07-040435, and a first-class identification code having a low priority is Japanese Unexamined Utility Model Publication No. 01-117957. Therefore, the specific item information of the Japanese Examined Utility Model Publication No. 07-040435, i.e., an abstract and a representative drawing are displayed on the detailed data display unit 919.

The data display system 10 has the priority display switching unit 14 related to first-class identification codes having different priorities, so that the priority display switching unit 14 acquires specific item information having a corresponding priority from the patent data server SV depending on the state of a publication data/registration data switching button (reference numeral 903 in FIG. 9) displayed on the display DP to switch displays to each other.

In FIG. 9, the display characters on the publication data/registration data switching button 903 represent "to unexamined application data" since the display is switched to the display of unexamined application data when the button is pressed during displaying examined application data. In contrast to this, the display characters represent "to examined application data" since the display is switched to the display of the examined application data when the button is pressed during displaying the unexamined application data. Even if a beginner operates the button, the intention of switching can be easily realized.

The display system has not only a function of accessing the patent data server SV in Japan, but also a function of connecting US Patent and Trademark Office (US-PTO), European Patent Office (EPO), and the like through the Internet. When the patent detailed data corresponding to the first-class identification codes are not on the patent data server SV, and when the detailed data are on a data server (e.g., the patent database of US Patent Office, the database of European Patent Office, and the like) in the foreign country, address conversion is performed to the data server to obtain detailed data.

A "JPO-IPDL" button 916, a "US. PTO" button 917, and an "EPO" button 918 in FIG. 9 are buttons for performing connection to Patent Office—Patent Electronic Library, US Patent and Trademark Office, and European Patent Office through the Internet.

The data display system 10 has the specific item display switching unit 16 for selecting the specific items of the second-class records to display the specific items. The specific item display switching unit 16 selects the items of second-class records exactly displayed on the display DP. For example, the specific item display switching unit 16 switches an abstract display and an all-document display to each other.

In FIG. 9, an abstract/all-document display selection button 905 is arranged, "abstract→all-document display" is displayed in this button during displaying all the documents. Depending on a button pressed in a specific state, a tag is selectively added to a second-class identification code requesting a second-class record from the patent data server SV.

For example, when the "abstract/all-document display" button 905 is pressed during displaying an abstract, a specific tag (e.g., "all-document") to the second-class identification code inherent in the second-class record, and specific item information (e.g., all documents) different from the specific item information corresponding to the second identification code to which the tag is added is requested from the patent data server SV to switch the display to the display of the specific item information. At this time, the display of the button 905 is switched from "abstract→all-document display" to "all-document→abstract display".

Figure 15:
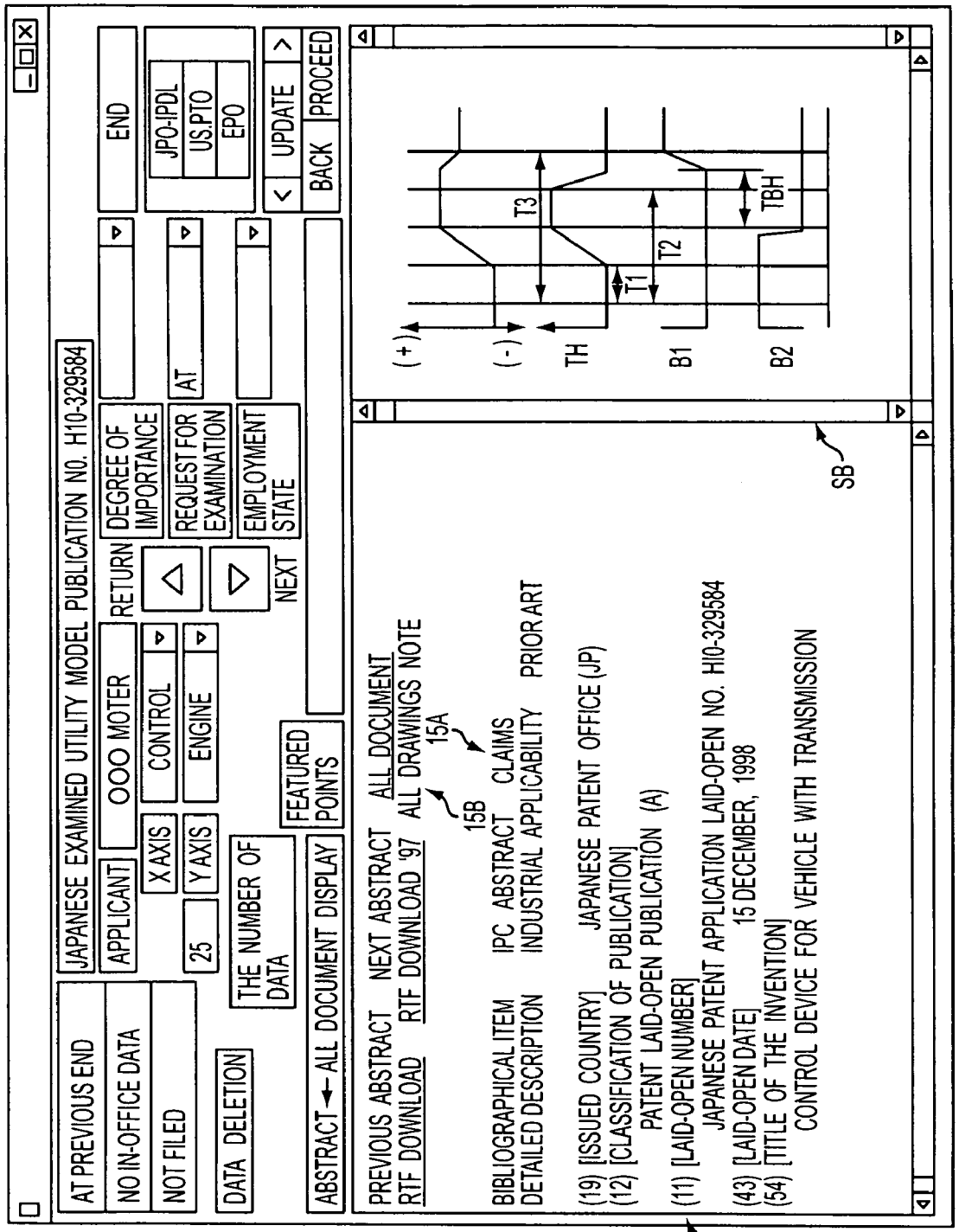
FIG. 15 is a diagram showing an all-document display state obtained by pressing an "abstract→all-document display" in FIG. 9.
Figure 16:
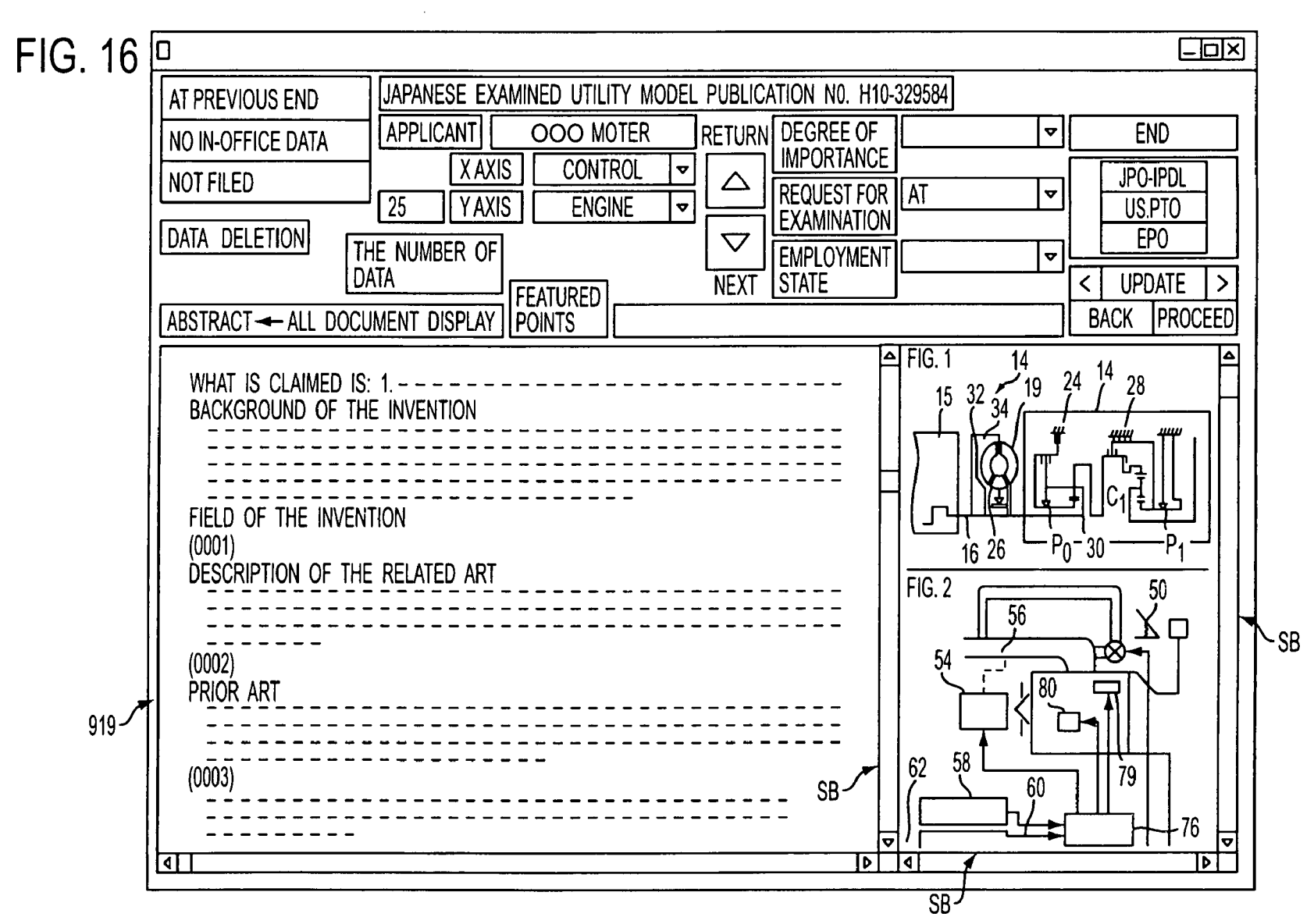

FIG 15 shows a state in which the detailed data display unit 919 is switched from an abstract display state (abstract and representative drawing are displayed in one window) into an all-document display state. All-document text data is displayed on the left window, and the representative drawing is displayed on the right window. (Note that a publication different from that in FIG. 9 is illustrated in FIG. 15 and FIG 16 (to be described later)). When a "claim" button 15A or an in the detailed data display unit 919 is pressed, as shown in FIG 16, the position of the text of the left window is jumped to "claim" to display the "claim", so that all the drawings are displayed in the left window (invisible portion can be fed downwardly by a scroll bar SB on the left side of each window). Another button in the detailed data display unit 919, e.g., "all drawing" button 15B, or a button of "industrial field" or "problem", the position of the text is jumped to the corresponding item to display the item, as a matter of course.

In addition, the data display system 10 has a data selection moving unit 18 in which, when a plurality of first-class records (e.g., record of Japanese Unexamined Utility Model Publication No. 5-1123 and record of Japanese Unexamined Utility Model Publication No. 1124) are on the basic data sheet DS, selection is moved to a first-class record (record of Japanese Unexamined Utility Model Publication No. 5-1124) next to a first-class record (e.g., record of Japanese Unexamined Utility Model Publication No. 5-1123) which is displayed at the present to acquire the first-class identification code (e.g., Japanese Unexamined Utility Model Publication No. 5-1124) of the record, and the record is converted into a second-class identification code.

The data selection moving unit 18 displays a selection moving input means of a record to be processed with a "to next ∇" button 910 and a "return Δ" button 909 on the display screen, shifts to the display of the next record according to the button operation input or returns to the previous record.

The data display system has a tag memory unit for storing a specific item selection tag (e.g., "# Claim") added to a second-class identification code inherent in a second-class record when specific item information (e.g., "claim") is displayed (see FIG. 16) by clicking the "claim" button 15A in the all-document display state shown in FIG. 15. In identification code conversion of record selection moving by the record selection moving button (the "to next ∇" button 910 or the "return Δ" button 909), a stored item selection tag is added to the second-class identification code, and specific item information (e.g., "claim") corresponding to the second-class identification code to which the stored item selection tag (e.g., "# Claim") is added is requested from the patent data server SV, so that the specific item information (e.g., "claim") is continuously displayed.

Therefore, even though record selection to be displayed is moved, the same item information as that of the previous record can be seen. For this reason, the contents can be quickly recognized.

In this manner, a publication is displayed to examine the contents of the publication, and an evaluation value along each evaluation value is selectively input, so that the value of the evaluation item is added to the basic data sheet DS (S18).

In FIG. 9, in order to make an evaluation input easy, an X axis evaluation value selection pull-down menu 907 (corresponding to a character string "body, chassis, . . . " of a list 602 of the evaluation data sheet HS in FIG. 6), a Y axis evaluation value selection pull-down menu 908 (corresponding to a character string "quality, cost reduction, and performance" of a list 604 of the evaluation data sheet HS in FIG. 6), a importance axis evaluation value selection pull-down menu 911 (corresponding to a character string "A, B, . . . " of a list 604 of the evaluation data sheet HS in FIG. 6), a request-for-examination axis evaluation value selection pull-down menu 912 (corresponding to a character string "existence, no, registered, . . . " of a list 605 of the evaluation data sheet HS in FIG. 6), and employment-state axis evaluation value selection pull-down menu 913 (corresponding to a character string "in-employment, employment is planned in next period, . . . " of a list 606 of the evaluation data sheet HS in FIG. 6 are arranged.

An operator opens the pull-down menu of an evaluation axis to which an evaluation value should be input to click the selected evaluation value, so that the evaluation value is taken by the basic data sheet DS.

At this time, the data display system 10 acquires a plurality of evaluation value data ("high", "low", "no", and the like in the degree of importance) from an evaluation data sheet HS in which evaluation value data related to at least one of a plurality of first-class records on the basic data sheet DS are stored in units of evaluation axes (e.g., X axis, Y axis, and the degree of importance) having different viewpoints and stores the plurality of evaluation value data. When one of the evaluation value data is selected, the evaluation value data is transmitted to the evaluation items of the first-class records on the basic data sheet DS corresponding to the evaluation data sheet HS and stores the evaluation data at corresponding positions on the basic data sheet DS.

More specifically, when evaluation value data is acquired, a value set in the evaluation value data is stored. When the evaluation value data is transmitted to a first-class record on the basic data sheet DS, simple codes such as serial numbers (1, 2, 3, . . . ) corresponding to values set in the evaluation value data are transmitted. When evaluation item data has been stored in a corresponding item on the basic data sheet DS, the evaluation item data is acquired. When the evaluation item data is a simple code, the simple code is converted into a corresponding character string on the evaluation data sheet HS to display the contents of the character string.

Therefore, since evaluation can be determined while watching detailed contents such as a publication of an unexamined application on the data display system 10, correct evaluation can be quickly performed, and a simple code is stored as the contents of an evaluation item of a first-class record on the basic data sheet DS, rearrangement (e.g., the order of Japanese syllabary) for the values set on the basic data sheet DS is not performed, but rearrangement can be performed by simple codes such as serial numbers. As a result, the data on the basic data sheet DS can be rearranged in a desired order.

More specifically, when the contents "body, chassis, engine . . . " are added to the data on the basic data sheet DS to rearrange the data, in general, the data "engine, chassis, drive, . . . ," may be arranged in the order of Japanese syllabary, i.e., may be arranged in an undesired order. When evaluation is performed by adding serial numbers "body=1, chassis=2, engine=3 . . . ", the data can be rearranged in a desired order. In addition, on the data display system 10, a character string of natural writing such as "body" is displayed as indicated by the pull-down menu (drop down list) 907 in FIG. 9. For this reason, evaluation can be quickly performed.

Furthermore, when character string (e.g., "by airbag expansion load") of specific information is selected from the specific item information (e.g., abstract) displayed on the detailed data display unit 919, the character string is stored. When an item (e.g., "X axis", "featured point", or the like, "featured point" in FIG. 9) to be added on the data display system is double-clicked, the character string of the specific information is added to a position corresponding to evaluation item data of the basic data sheet DS, and the character string of the specific information is additionally stored in the evaluation data sheet HS. For this reason, since the evaluation item data can be added on the data display system without returning to the evaluation data sheet HS, a cumbersome operation such as a screen switching operation can be omitted.

In FIG. 8, a character string 8A which is an "armrest and airbag" of a cell below "featured point"=cell at row 11 and column J is character string input to the text box 914 of the "featured point" in FIG. 9. A numeral value "1" 8B of a cell below "X axis"=cell at row 11 and column K corresponds to "body"="1" of "X axis" of the evaluation data sheet HS in FIG. 6, and represents "body" of the "X axis" pull-down menu 907 in FIG. 9. Similarly, pieces of information, i.e., "Y axis", "degree of importance", "request for examination", and "employment state" are stored in the basic data sheet DS with numeral values corresponding to data displayed by character strings in FIG. 9.

An evaluation value is selected in S18 in FIG. 2 to check whether the record is the next record in S20. If the record is the next record, the flow returns to S16. If the record is not the next record, it is determined that all the records of the basic data sheet DS are evaluated.

On the basic data sheet DS that has been evaluated, various static data can be displayed. FIG. 14 shows an example of a static table in which data are totalized in units of applicants.

A two-dimensional map obtained by two designated evaluation axes is formed (S22).

The map is formed such that records on the basic data sheet DS in which cells are two-dimensionally arranged are edited independently of the basic data sheet DS to arrange the records at the cells on the map sheet MS.

This map, for example, as shown in FIG. 10, pieces of information including descriptions or the like having short featured points constituted by character strings arbitrarily selected, i.e., applicants, publication numbers (patent numbers), titles of inventions, and filing dates are arranged on the map in units of publications of unexamined applications (or publications of (unexamined) patent applications.

Various map displays are performed by a map sheet (S24), a cell is selected to display the details of a cell on the map (S26), and a content display button is pressed. A publication number or the like serving as a first-class identification code is acquired from the cell in the same processes as those in the detailed display in S16 in FIG. 2, the publication number or the like is converted into a second-class identification code, and the patent data server SV is accessed to obtain the detailed information of a publication serving as a second-class record, so that the detailed information can be displayed on a display (S28).

Here, the patent map forming system 20 will be described below. From a first-class records stored in the basic data sheet DS, on the basis of values of (e.g., international patent classifications) of first specific items, the values are-totalized, and overlapping values are removed. In this state, the values are rearranged in a predetermined arrangement order (e.g., the order of frequency) to be listed (see list 11A in FIG. 11), and the values (e.g., international patent classifications) are sequentially selected from the list (see list 11B in FIG. 11). The values are listed together with sequential first simple codes (first serial numbers) corresponding to the values, and stored and set (first evaluation item listing setting means, list 607 related to "classification" in FIG. 6).

In addition, from the data group described above, on the basis of the values of second specific items (e.g., applicants), the values are totalized, and overlapping values are removed. In this state, the values are rearranged in a predetermined arrangement order (e.g., the order of frequency) to be listed (see list 14A in FIG. 14), and the values (e.g., applicants) are sequentially selected from the list. The values are listed and set together with sequential second simple codes (second serial numbers) corresponding to the values (second evaluation item listing setting means, (list 608 related to "applicant" in FIG. 6).

On the basis of the values (e.g., international patent classifications, a column of "classification"), i.e. column C, of FIG. 7) of the first specific items of data on the basic data sheet DS, classification (first-classifying means) is performed by first simple codes (e.g., first serial numbers representing international patent classifications) corresponding to the values of the first specific items set by the first evaluation item listing setting means (column of "classification code"), i.e. column Q, of FIG 8). On the basis of the values of the first specific items of data on the basic data sheet DS, classification (second classifying means) is performed by second simple codes (e.g., second serial numbers representing applicant codes) corresponding to the values of the second specific items set by the second evaluation item listing setting means (column of "applicant code"), i.e.

column R, of FIG 8. The operation performed up to this corresponds to previous preparation for map formation of the patent map forming system 20.

The patent map forming system 20 also prepares a map sheet MS independently of the basic data sheet DS. This map sheet MS is a sheet in which a plurality of cells are horizontally and vertically arranged.

FIG. 10 is a diagram showing an example of the map sheet MS, and shows an example in which a two-dimensional patent map is formed by using an applicant as an abscissa and an international patent classification as an ordinate.

Figure 11:
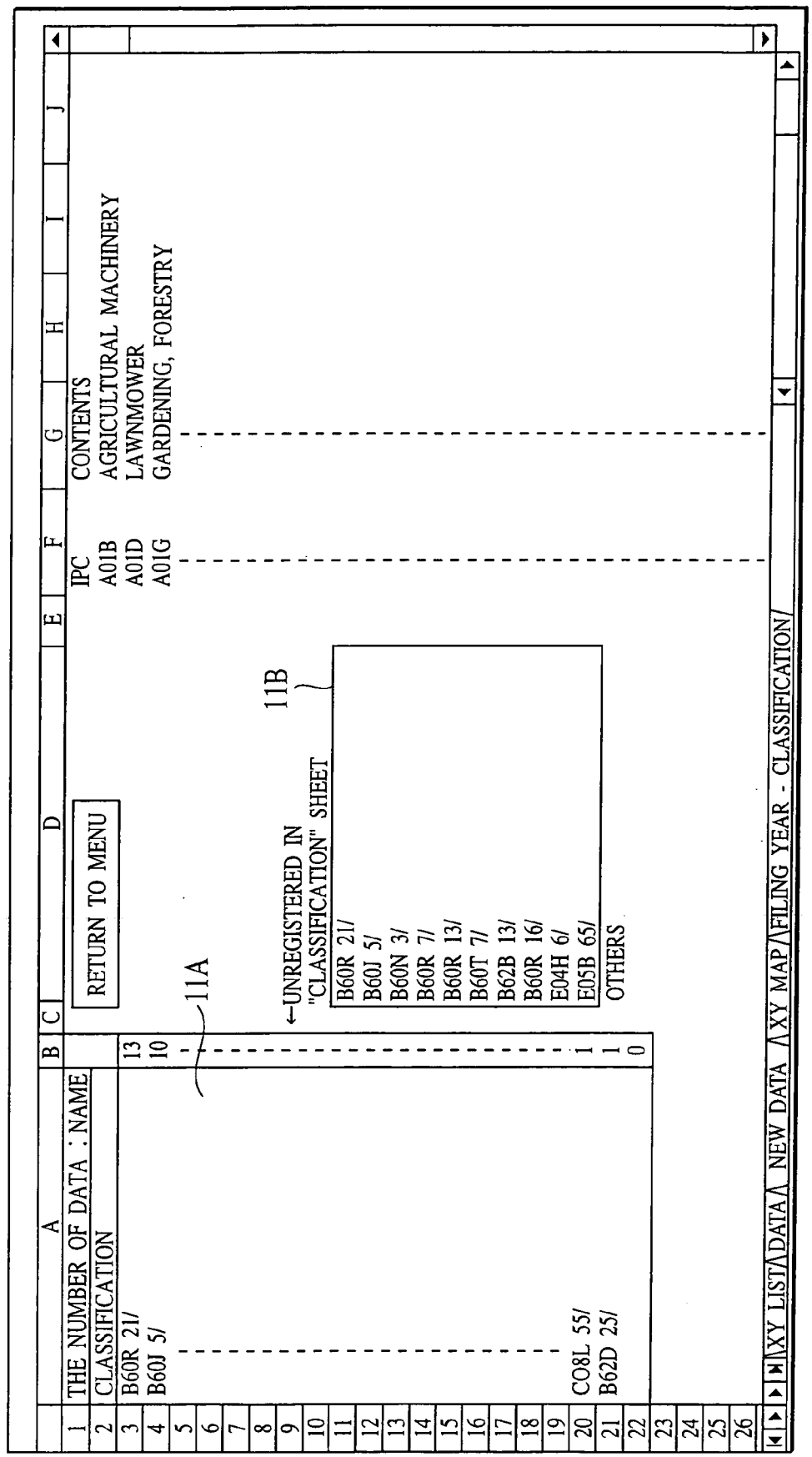
FIG. 11 is a diagram showing an example of a classification sheet screen in the embodiment.

FIG. 11 is a display example of a classification sheet in which the contents of international patent classifications are stored in units of classifications, shows a totalizing list 11A, and shows, at the center, a selection list 11B in which the first to tenth classifications are selected from the totalizing list 11A.

In order to form a map, a "MAP formation/updating" button 10A on the map sheet MS. Upon completion of the operation, second simple codes (e.g., second serial numbers representing applicant codes) listed by the second evaluation item listing setting means are horizontally rearranged on the right side on the map sheet MS in the order of the list to have an interval in a vertical column on at least a left side (second simple code parallel arrangement means). Therefore, display specific items (applicant, publication number, degree of importance, featured point, and the like, for example, an applicant is abbreviated as three initial characters or the like), the first simple codes, and the second simple codes of data on the basic data sheet DS in the order of the rearrangement performed for the first simple codes (e.g., first serial numbers representing international patent classifications) are acquired. The vertical position on the map sheet is determined by the first simple codes, and the horizontal position on the map sheet is determined by the second simple codes (e.g., second serial numbers representing applicant codes). A display specific item (publication number, degree of importance, featured point, and the like) is arranged at cell a position where the vertical position and the horizontal position cross, and the first simple codes are arranged (specific item mapping means) on the left column opened by the second simple code parallel arrangement means.

The second simple code parallel arrangement means has a second display conversion unit for displaying values (e.g., corresponding to applicant names such as "XXX Motor" or "OOO Motor Co." in FIG. 10) corresponding to the second simple codes set by the second evaluation item listing setting means. The specific item mapping means has a first display conversion unit for displaying values (e.g., corresponding to international patent classifications such as "B60R21/", "B60J5/", . . . and the like in FIG 10) set by the first evaluation item listing setting means corresponding to the first simple codes arranged on the left column on the map sheet MS. For this reason, since items which can be easily understood even though the data are evaluated by the simple codes (e.g., serial numbers representing applicants or serial numbers representing classifications) can be set as titles, the contents can be more easily understood.

The formed map sheet MS is designed to be displayed on the display DP, printed, or output as a file to a memory means such as a hard disk.

The map sheet MS is formed and examined to effectively use the patent data, so that the operations of easily and precisely analyzing the patent data can be performed.

Therefore, the patent application states of respective corporations in technical fields depending on international patent classifications can be recognized, and technical trend from the point of view of patents can be easily analyzed.

At least one of the first and second evaluation item listing means may be a means for equally dividing a value between the maximum value and the minimum value of the numeral values (e.g., filing years) extracted from specific items (e.g., filing dates), which can be treated as numeral values, of the items of the basic data sheet and corresponding to the specific items into predetermined values (every year) to list the equally divided numeral values (every year) (list 609 related to "filing year" in FIG. 6.

In the system described above, evaluation items can be automatically input, cumbersome operations can be omitted, and a data map can be easily formed.

In addition, at least one of the first and second evaluation item listing means may be a means for totalizing the frequencies of the values (e.g., international patent classifications or applicants) of the specific items of the data on the basis data sheet and rearranging the values in the order of the frequency, and sequentially listing a value having a high frequency first.

According to this, a value (e.g., international patent classification or applicant) of a specific item which frequently appears as data is evaluated and input first.

In addition, the data map forming system acquires a plurality of list items set by the first evaluation item listing setting means, one of the list items can be selected (first evaluation item selection means, pull-down menu 10C of the ordinate in FIG. 10). A plurality of list items set by the second evaluation item listing setting means are acquired, and one of the list items can be selected (second evaluation item selection means, pull-down menu 10B of the abscissa in FIG. 10). By the first evaluation item selection means 10C or the second evaluation item selection means 10B, on the basis of the selected item, a display position is moved to a cell at the crossing point of the first/second items on the map sheet MS, so that the cell at the crossing point is selected (on-map moving means).

In FIG 10, "XXX Motor" is selected from the pull-down menu (drop-down list) 10B and "B60R21/" is selected from the pull-down menu (drop down list) 10C. For this reason, the cell at row 11 and column C which is the crossing point between the pull-down menu 10B and the pull-down menu 10C.

In addition, display specific items (the three initial characters of applicant, publication number, degree of importance, featured point, and the like, "Nissan Motor, Japanese Examined Utility Model Publication No. 07-040435 . . . (cut). . . thin portion torn by airbag expansion load in armrest ) includes first-class identification code data (e.g., Japanese Unexamined Patent Publication No. 11-12345, Japanese Examined Utility Model Publication No. 07-040435). The item of a first-class identification code is acquired from the display specific items, and first-class identification code data on the map sheet MS is converted into an address inherent in detailed data. On the conversion result, specific item information (e.g., abstract or representative drawing) is requested from the patent data server SV, so that the specific item information is displayed.

Figure 13:
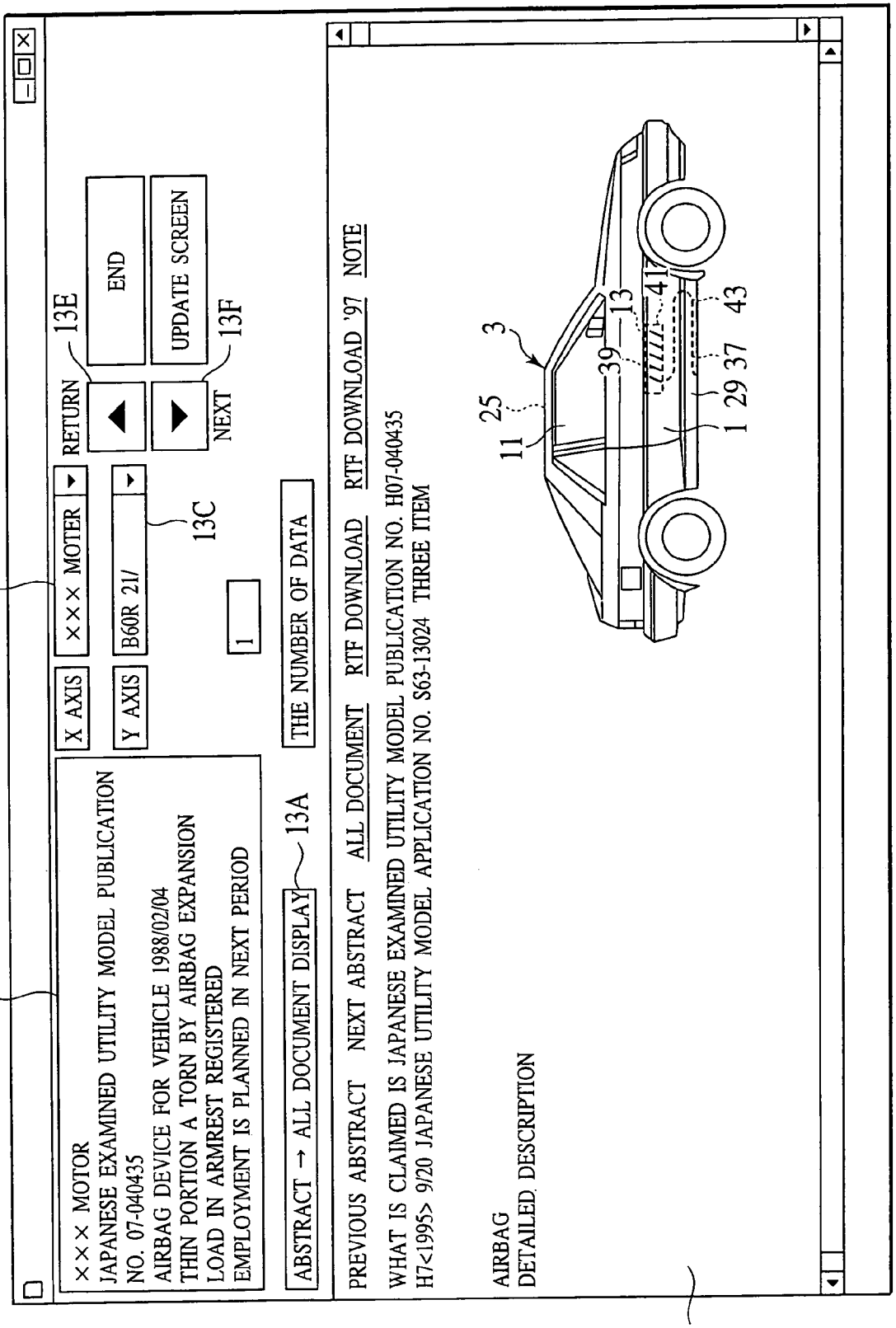
FIG. 13 is a diagram showing an example of a detailed display screen of a cell in a map obtained by the display system according to the embodiment.

FIG. 13 is a screen which is displayed when a cell at row 11 and column C on the map sheet in FIG. 10 is selected and when a content display button is pressed. Since Japanese Examined Utility Model Publication No. 07-040435 is displayed at row 11 and column C in FIG. 10, when a content display button 10D is pressed, the abstract of Japanese Examined Utility Model Publication No. 07-040435 is displayed as shown in FIG. 13. This abstract display is designed to display an all-document display by pressing a "abstract→all-document display" button 13B.

The display means has a first evaluation item selection unit ("ordinate" pull-down menu 13C in FIG. 13) for acquiring a plurality of list items set by the first evaluation item listing setting means to make it possible to select one of the list items, a second evaluation item selection unit ("abscissa" pull-down menu 13B in FIG. 13) for acquiring a plurality of list items set by the second evaluation item listing setting means to make it possible to select one of the list items, an on-map moving selection unit for moving a display position to a cell at the crossing point between the first/second items on the map sheet on the basis of the item selected by the first evaluation item selection unit 13C or the second evaluation item selection unit 13B and selecting the cell at the crossing point, and an item acquisition unit for acquiring the item of the first identification code from the display specific items at the positions selected by an on-map moving selection unit. For this reason, the display position can be moved on the map sheet by the display means, and data corresponding to a patent whose specific item information also moves can be displayed on a detailed data display unit 13D.

More specifically, when other evaluation values selected by the pull-down menus of the abscissa and the ordinate, the contents of a cell two-dimensionally selected by the two evaluation values are displayed. A display specific item is also displayed on a display item unit 13G. The detailed data display unit 13D has a function (function of the items of "all drawing" and "claim" described above) equal to that of the detailed data display unit 919 in FIG. 9.

In addition, when a "return Δ" button 13E or a "to next ∇" button 13F in FIG. 13 are pressed, four data (data at column C and rows 11 to 14 in FIG. 10) in which the evaluation value of the abscissa is Nissan Motor and the evaluation value of the ordinate is a classification (B60R 21) are sequentially displayed.

The operations of the data display system and the map system according to the embodiment will be described below.

Figure 3:
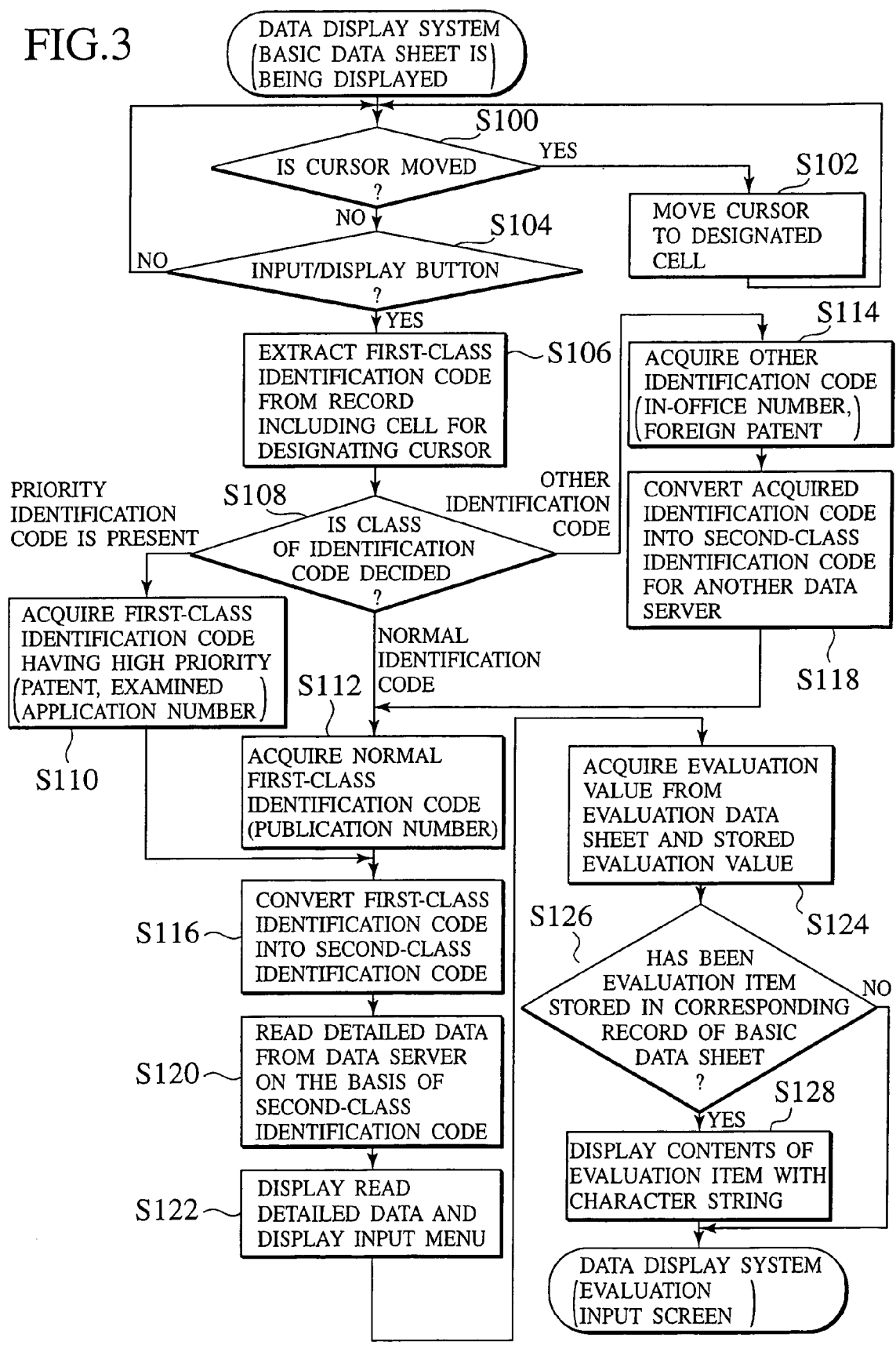
FIG. 3 is a flow chart showing the operation of a data display system according to the embodiment to explain a shift from a basic data sheet display state to an evaluation input screen.

In FIG. 3, the data display system 10 loads an input file DI, and the operation is started from a state in which the basic data sheets DS as shown in FIGS. 7 and 8 are being displayed.

It is decided whether cursor moving is designated or no (S100). If cursor moving is designated, the cursor is moved to a designated cell (S102), the flow returns to S100. If cursor moving is not designated, it is decided whether "input of evaluation or the like/content display input" button (701 in FIG. 7 is pressed or not (S104). If the button is not pressed, the flow returns to S100. If the "input of evaluation or the like/content display input" button is pressed, a publication number and a patent (examined patent application) number are extracted from the first-class records on the basic data sheet DS including the cell designated by the cursor (S106).

The types of the extracted first-class identification codes are designated (S108). To the first identification codes, priorities depending on the types of patent (examined patent application) number>publication number>application number>intra-office reference number are added. If there is a first-class identification code such as a patent number or an examined application number having a high priority, the flow shifts to S110 to acquire the first-class identification code having a high priority, and the flow shifts to S116 to convert the first-class identification code into an identification code for accessing the patent data server SV. If there is a publication number having a normal priority, the flow shifts to S112 to acquire the normal first-class identification code, and the flow shifts to S116.

If there is no patent (examined patent application) number and no publication number, a first-class identification has a lower priority. For this reason, the flow shifts to S114 to acquire another identification code, and the acquired identification code is converted into a second-class identification for another data server (S118).

In S116, the first-class identification code is converted into a second-class identification code for accessing the patent data server SV. On the basis of the second-class identification code, the abstracts of the corresponding official gazette, publication of examined patent applications, publication of unexamined patent applications, and the like and the detailed data such as representative drawings are read from the patent data server SV (S120), and the read detailed data are displayed (detailed data display unit 919 in FIG. 9). On the basis of the displayed detailed data, input menus (the X axis evaluation value selection pull-down menu 907, the Y axis evaluation value selection pull-down menu 908, the importance-axis evaluation value selection pull-down menu 911, the request-for-examination axis evaluation value selection pull-down menu 912, the employment-state axis evaluation value selection pull-down menu 913, and the text box 914 for inputting a featured point) are displayed (S122).

At this time, an evaluation value list is acquired from the evaluation data sheet HS (S124), and it is decided whether an evaluation item has been stored in a corresponding record of the basic data sheet DS which acquires the first-class identification code to display details or not (S126). If the evaluation item has been stored, the contents of the evaluation value of the evaluation item is displayed with a character string on the screen (S128). This state corresponds to an evaluation input screen in FIG. 9.

FIG. 4 is a flow chart for explaining display switching and inputting an evaluation value on the evaluation input screen.

In FIG. 4, it is decided whether a button 901, 902, 903, 904, 905, 909, 910, 915, 916, 917, 918, or the like or a pull-down menu (drop-down list) 907, 908, 911, 912, or 913 is operated or not (S20). If the button or the menu is operated, the operated button or pull-down menu is decided.

In this example, it is decided whether an "abstract→all-document display" button (905 in FIG. 9) is pressed or not (S202). If the "abstract→all-document display" button is pressed, i.e., Yes (=when the button in pressed) is determined in step S202, an "all-document" tag is added to the second identification code to display all the documents of a displayed publication. The patent data server SV is accessed to read all the documents (S204). In this case, if the tag is added to the second-class identification code, the tag is stored in a tag memory unit (S206). Detailed data read next is displayed on the display (S208), the display of the button 905 is switched to "all-document→abstract display", and the flow returns to step S200.

If the display of the button 905 is not "abstract→all-document display" in the decision of the button operation in S202, it is decided the button is operated or not when the display of the button 905 is "all-document→abstract display" (S210). If Yes in step S210, the patent data server SV is accessed by only the second identification code to read the abstract (S212), and the flow shifts to step S206. In step S212, a function of clearing "tag" information of the tag memory unit also exists.

If the "all-document→abstract" button is set in the decision in step S210, it is decided whether a "claim" button displayed on the display unit 919 is pressed or not (S214). If Yes in step S214, a tag "# Claim" is added to the second-class identification code to access the patent data server SV, claims are read (S216), and the flow shifts to S206.

If the "claim" button is not set in the decision in step S214, it is decided whether the "to next ∇" button 910 or the "return Δ" button 909 are pressed or not (S218). If Yes in step S218, a first-class identification class is extracted from a "next" record or a "previous" record on the basic data sheet DS (S220), and a first-class identification code having a high priority is selected. The first-class identification code is converted into a second-class identification code (S222). If the tag of an "all-document" display or a "claim" display is stored in the tag memory unit, the tag is added to the second-class identification code, and data is read from the patent data server SV (S224). The flow shifts to step S206.

If the "to next ∇" button 910 or the "return Δ" button 909 is not set in the decision in step S218, it is decided whether an evaluation item is selected next or not (S226).

In a decision of evaluation item selection, when pull-down of the pull down menu (907, 908, 911, 912, and 913 in FIG. 9) for displaying an evaluation value list of respective evaluation axes is designated, when any one of a plurality of evaluation value data of the pull-down menu displayed as character strings is clicked, it is decided that the evaluation item is selected.

If the evaluation item is selected, a simple code (value of a serial number) corresponding to evaluation value data (character string) designated by the pull-down menu is acquired from the evaluation data sheet HS (S228). The simple code is transmitted to an item corresponding to the corresponding record of the basic data sheet DS and stored (S230). Thereafter, the flow returns to S200.

If the evaluation item selection is not set in the decision in step S226, it is decided whether the other buttons 901, 902, and the like are operated or not, and the flow shifts to a process (to be described later) corresponding to the button. After the processes of the buttons except for an end button 915 are performed, the flow returns to S200 to return to a standby state for input.

The button 910 is a button for acquiring previous end number (previously evaluated data number) information on the basic data sheet DS, jumping to the record, and displaying the information. The button 902 is a button in which, although "no intra-office data" is displayed at present, when intra-office data exists at the column of "intra-office reference number" in FIG. 8=column P, "intra-office data exists" is displayed and which can access an intra-office server. The button 904 is a button for deleting a record on the basic data sheet DS corresponding to a publication displayed at present. The button 915 is a button for ending the data display system. The detailed description of the flows related to these buttons will be omitted. Since the operations of the buttons 916, 917, and 918 have been described above, a description thereof will be omitted.

When all the records on the basic data sheet are evaluated on the evaluation input screen in FIG. 9, the flow shifts to the map forming system in FIG. 5. FIG. 5 is a flow chart for explaining the operation of the map forming system. A case in which a two-dimensional map using applicant international patent classification as evaluation axes is formed will be exemplified.

In the map forming system, the items of the international classifications of the records on the basic data sheet DS are totalized, and overlapping values are removed. The items are rearranged in the order of appearance frequency and listed to be stored on the evaluation data sheet HS (S300).

Applicants are totalized from the basic data sheet DS, and overlapping values are removed. The applicants are rearranged in the order of appearance frequency, and listed to be stored on the evaluation data sheet HS (S302). Simple codes (serial numbers) are added to the evaluation items of the international patent classifications on the basic data sheet DS (S304), and simple codes (serial numbers) are added to the evaluation items of the applicants on the basic data sheet DS (S306).

The evaluation items are horizontally arranged on the map sheet MS in the order of the simple codes of the applicants on the evaluation data sheet HS (S308). The items of the basic data sheet DS are rearranged such that the first priority is given to the simple codes corresponding to the international patent classifications and the second priority is given to the simple codes of the applicants (S310).

The records are taken from the start of the rearranged basic data sheet DS one by one, and, of the records, the simple codes of the international patent classifications and the simple code of the applicants are acquired. In this manner, cell positions on the map sheet using the applicant as the abscissa and using the international patent classification as the ordinate are determined (S314). The records are edited and arranged at the determined cell positions (S316). The result is shown in FIG. 10.

The map sheet is not limited to the applicant-classification map in FIG. 10. A filing year-classification map or a filing year-applicant map can also be displayed. In addition, in FIG. 6, an X-axis-Y-axis map whose axes are arbitrarily set can also be displayed.

FIG. 12 shows an example of the X-axis-Y-axis map. On each of the ordinate and the abscissa, character strings set as evaluation values are displayed as an axis scale. When a plurality of records includes equal X-axis evaluation values and equal Y-axis evaluation values, these records are arranged and displayed in the vertical direction. On the vertical axis scale corresponding to the plurality of records, the vertical axis scale corresponding to the first record is displayed with large display characters, and the vertical axis scales corresponding to the second or subsequent records are displayed with small display characters, so that the map can be easily seen.

The color of a cell in which a record having a specific evaluation value is displayed can also be displayed in color. From the X-axis-Y-axis map, a detailed display of an abstract, all documents, or the like can also be performed by a content display button.

The embodiment described above describes the case in which a plurality of records for forming a data map are transmitted from the patent data server SV to a user terminal PC of an examiner through a communication path such as a LAN. However, the present invention is not limited to the embodiment, the bibliographical items of a publication or drawings may be directly read from a recording medium such as a CD-ROM in which publications of unexamined patent applications may be stored into the user terminal PC and may be processed, as a matter of course.

As has been described above, according to the present invention, an arbitrary evaluation axis can be easily set, and data to be processed can be evaluated from various viewpoints. A basic data sheet in which the values of evaluation items are set and detailed data to be evaluated can be easily switched and displayed. For this reason, power required for an evaluation operation can be saved.

Evaluation values derived from the items included in the records of the basic data sheet can be automatically set, and the evaluation values can be automatically input.

Evaluation results can be visibly displayed as a two-dimensional data map by selecting two evaluation axes. List data can be effectively used, and evaluation can be performed while checking the detailed data of a database. An analysis of data to be examined can be easily performed.

The entire content of a Japanese Application No. P2000-089866 with a filing date of Mar. 28, 2000 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A data map forming system comprising:
    a basic data sheet which can store a plurality of first records including a plurality of different items of document numbers identified under plain names in a list state;
    first evaluation item listing means for listing by totalizing values of first specific items constituted by numeral values of a plurality of first records on the basic data sheet or values of first specific items and arranging the values and first simple codes corresponding to the values in a predetermined arrangement order in such a state that overlapping values of the values are removed;
    second evaluation item listing setting means for totalizing values of second specific items of the plurality of first records on the basic data sheet and arranging the values and second simple codes corresponding to the values in a predetermined arrangement order in such a state that overlapping values of the values are removed;
    first-classifying means for classifying the plurality of first records by the first simple codes corresponding to the values set by the first evaluation item listing means on the basis of the values of the first specific items of the first records;
    second classifying means for classifying the plurality of first records by the second simple codes corresponding to the values set by the second evaluation item listing means on the basis of the values of the second specific items of the first records;
    rearrangement means for rearranging the plurality of first records while giving priority to the first simple codes given by the first-classifying means and rearranging the plurality of first records by the second simple codes given by the second classifying means;
    a map sheet different from the basic data sheet;
    second simple code parallel arrangement means for arranging the second simple codes listed by the second evaluation item listing means on the map sheet in an order of a list on a right side in the horizontal direction in such a state that an interval is opened in a vertical column on at least the left side;
    specific item mapping means for acquiring display specific items, the first simple codes, and the second simple codes from the plurality of first records in the order of the first records rearranged by the first simple codes, determining vertical direction positions on the map sheet means by the first simple codes and horizontal direction positions on the map sheet by the second simple codes, arranging the display specific items at cell positions where the vertical direction positions and the horizontal direction positions cross, and arranging the first simple codes on the left column opened by the second simple code parallel arrangement means; and
    output means for displaying or printing a matrix-like map sheet formed by the specific item mapping means or performing file outputting.

2. A data map forming system according to claim 1, wherein
    at least of the first and the second evaluation item listing means equally divides a value between the maximum value and the minimum value of numeral values corresponding to specific items, which can be treated as numeral values, of the first records in a predetermined range and lists equally divided values.

3. A data map forming system according to claim 1, wherein
    at least one of the first and the second evaluation item listing means totalizes frequencies of the specific items of the plurality of first records on the basic data sheet, rearranges the values in the order of frequency, and lists the values.

4. A data map forming system according to claim 1, comprising:
    first evaluation item selection means for acquiring a plurality of list items set by the first evaluation item listing means to make it possible to select one of the list items;
    second evaluation item selection means for acquiring a plurality of list items set by a second evaluation item listing means to make it possible to select one of the list items; and
    on-map moving means for moving a display position to a crossing point between the first and second items on a map sheet by the first evaluation item selection means or the second evaluation item selection means on the basis of the selected item.

5. A data map forming system according to claim 1, wherein
    the display specific items of the first records arranged on the map sheet include a first identification code which can be easily or generally understood by a reader or an operator on at least the basic data sheet; and comprising:
    acquiring means for acquiring an item of the first identification code from the display specific items;
    conversion means for converting the acquired item of the first identification code into a second identification code of a kind of document number adapted for access to a defined data base; and
    display means for acquiring first specific item information of a second record identified by the second identification code obtained by the conversion means from a data server in which a plurality of second records including items corresponding to the items of the first identification codes and a plurality of items related to the items of the first identification codes are stored such that second identification codes are given to the second records, and displaying the specific item information.

6. A data map forming system according to claim 5, wherein
    the display means comprises:
    a first evaluation item selection unit for acquiring a plurality of list items set by the first evaluation item listing means to make it possible to select one of the list items;

a second evaluation item selection unit for acquiring a plurality of list items set by the second evaluation item listing means to make it possible to select one of the list items;

an on-map moving selection unit for moving a display position to a crossing point between the first and second items on a map sheet by the first evaluation item selection unit or the second evaluation item selection unit on the basis of the selected item; and an item acquiring unit for acquiring an item of the first identification code from the display specific items at the position selected by the on-map moving selection unit.

7. A data map forming system according to claim 1, wherein the second simple code parallel arrangement means comprises a second display conversion unit for displaying a value corresponding to the second simple code set by the second evaluation item listing means, and the specific item mapping means comprises a first display conversion unit for displaying a value set by the first evaluation item listing means corresponding to the first simple codes arranged on a left column on the map sheet.

8. A data map forming method comprising:

using a processing unit to extract a plurality of values of predetermined references related to a plurality of first records on a basic data sheet in which the plurality of first records including a plurality of different items of document numbers identified under plain names can be stored in a list state to list the values as first simple codes in a predetermined arrangement order;

using a processing unit to extract a plurality of values of predetermined references having a viewpoint different from the viewpoint of the first simple codes to list the values as second simple codes in a predetermined arrangement order;

using the processing unit to classify the first records by the first simple codes corresponding to the values on the basis of numeral values of the plurality of first records on the basic data sheet or first specific items constituted by character strings;

using the processing unit to classify the first records by second simple codes corresponding to the values on the basis of values of second specific items of the plurality of first records on the basic data sheet;

rearranging the plurality of first records on the basic data sheet by the predetermined references while giving priority to the first simple codes and rearranging the second simple codes;

arranging the second simple codes on a map sheet in an order of a list on a right side in a horizontal direction in such a state that an interval is opened in a vertical column on at least a left side;

sequentially acquiring the specific items of the first records, the first simple codes, and the second simple codes in the order of the first records rearranged by the first simple codes;

using the processing unit to determine vertical direction positions on the map sheet by the first simple codes and horizontal direction positions on the map sheet by the second simple codes in the acquisition order;

using the processing unit to arrange the specific items at positions where the vertical direction positions and the horizontal direction positions cross, and arranging the first simple codes on the left column opened by second simple code parallel arrangement means;

using the processing unit to form a matrix-like map sheet; and outputting the matrix-like map sheet to a display system.

* * * * *